US009038188B2

(12) United States Patent
Adams et al.

(10) Patent No.: US 9,038,188 B2
(45) Date of Patent: May 19, 2015

(54) PROTECTING DATA STORED IN A CHIP CARD INTERFACE DEVICE IN THE EVENT OF COMPROMISE

(75) Inventors: Amanda Jane Adams, Chester (GB); Richard John Woodward, Warrington (GB)

(73) Assignee: Bank of America Corporation, Charlotte, NC (US)

( * ) Notice: Subject to any disclaimer, the term of this patent is extended or adjusted under 35 U.S.C. 154(b) by 823 days.

(21) Appl. No.: 12/847,366

(22) Filed: Jul. 30, 2010

(65) Prior Publication Data

US 2011/0179494 A1 Jul. 21, 2011

Related U.S. Application Data

(63) Continuation-in-part of application No. 12/752,567, filed on Apr. 1, 2010.

(60) Provisional application No. 61/295,515, filed on Jan. 15, 2010.

(51) Int. Cl.
*G06F 21/00* (2013.01)
*G07F 7/10* (2006.01)

(52) U.S. Cl.
CPC .................................... *G07F 7/1008* (2013.01)

(58) Field of Classification Search
CPC ........ G07F 7/1008; G06F 21/86; G06F 21/71
See application file for complete search history.

(56) References Cited

U.S. PATENT DOCUMENTS

| | | | |
|---|---|---|---|
| 5,953,700 | A | 9/1999 | Kanevsky et al. |
| 7,499,551 | B1 | 3/2009 | Mire |
| 2005/0010786 | A1 | 1/2005 | Michener et al. |
| 2005/0114662 | A1 | 5/2005 | Meyer et al. |

(Continued)

FOREIGN PATENT DOCUMENTS

WO WO 2010/059040 A1 5/2010

OTHER PUBLICATIONS

International Search Report and the Written Opinion of the International Searching Authority mailed Mar. 14, 2011 for International Application No. PCT/US 11/21085.

(Continued)

*Primary Examiner* — Brandon Hoffman
*Assistant Examiner* — Nega Woldemariam
(74) *Attorney, Agent, or Firm* — Michael A. Springs; Moore & Van Allen PLLC; Patrick B. Home

(57) ABSTRACT

A chip card interface device (CCID) is configured for protecting data stored at the CCID in the event of a compromise. The CCID has a housing and a compromise detection system including one or more detection devices configured for detecting a compromise of the housing. The compromise detection system is configured for generating a detection signal indicating the detected compromise. A data protection system is coupled with the compromise detection system and includes a memory device and a processing device coupled with the compromise detection system. The processing device is for receiving the detection signal and erasing data stored on the memory device based on the detection signal in some embodiments. In some embodiments, the processing device also activates a locking function for rendering itself inoperable based on the detection signal.

46 Claims, 18 Drawing Sheets

(56) References Cited

U.S. PATENT DOCUMENTS

| | | | | |
|---|---|---|---|---|
| 2005/0166061 | A1 | 7/2005 | Brookner et al. | |
| 2005/0289652 | A1 | 12/2005 | Sharma et al. | |
| 2007/0106894 | A1 | 5/2007 | Zhang et al. | |
| 2008/0077802 | A1 | 3/2008 | Richardson et al. | |
| 2008/0184341 | A1 | 7/2008 | Sebesta et al. | |
| 2009/0106563 | A1 * | 4/2009 | Cherpantier | 713/194 |
| 2009/0259850 | A1 | 10/2009 | Ishibashi | |
| 2011/0072279 | A1 * | 3/2011 | Milliken | 713/194 |

OTHER PUBLICATIONS

International Search Report and the Written Opinion of the International Searching Authority mailed Mar. 22, 2011 for International Application No. PCT/US 11/21076.

http://www.bellid.com/index.php/content/view/344/89/, "I-PIN: Enabling PIN Changes via the Internet". Published at least on Jan. 15, 2010. 3 pages. Retrieved Jan. 15, 2010.

The International Bureau of WIPO. PCT International Preliminary Report on Patentability and Written Opinion dated Jul. 17, 2012. International Application No. PCT/US2011/021076. International Filing Date: Jan. 13, 2011. Name of Applicant: Bank of America Corporation et al. English Language. 7 pages.

The International Bureau of WIPO. PCT International Preliminary Report on Patentability and Written Opinion dated Jul. 17, 2012. International Application No. PCT/US2011/021085. International Filing Date: Jan. 13, 2011. Name of Applicant: Bank of America Corporation et al. English Language. 10 pages.

* cited by examiner

PROTECTING DATA STORED IN A CHIP CARD INTERFACE DEVICE IN THE EVENT OF COMPROMISE

CROSS REFERENCES TO RELATED APPLICATIONS

This Non-provisional patent application claims priority to Provisional Patent Application Ser. No. 61/295,515 titled "Personal Identification Number Changing System and Method," filed Jan. 15, 2010, assigned to the assignee hereof and hereby expressly incorporated by reference herein. This application is also a continuation-in-part of patent application Ser. No. 12/752,567 titled "Personal Identification Number Changing System and Method," filed Apr. 1, 2010, assigned to the assignee hereof and hereby expressly incorporated by reference herein.

FIELD

In general, embodiments of the invention relate to devices used in reading and writing to chip cards and, more particularly, relate to systems, methods, and computer program products for protecting data stored in a chip card interface device in the event of a compromise.

BACKGROUND

Bank cards, including credit and debit cards, are used by cardholders to make purchases, cash withdrawals, and other financial transactions at bank card machines, such as automated teller machines (ATMs), point-of-sale (POS) terminals, and the like. For example, one type of bank card has a magnetic stripe that holds information about a credit or debit account. The cardholder can then access the credit or debit account by, for example, swiping the bank card by a magnetic stripe reader on the bank card machine. A newer type of bank card, generally referred to as a "chip card," "smart card," or "integrated circuit card" includes an on-card electronic chip such as a processor, microprocessor, memory, another type of electronic chip, or combinations of these devices.

Such chip cards provide the opportunity for localized storing of application(s) and data such as one or more personal identification number(s) (PINS) in a secure format. During a transaction, authentication can be performed locally at the POS terminal without requiring online authentication. Such local authentication is more effective than previous attempts for local authentication because of the possibility of additional security such as encryption of PINs stored on chip cards.

When a chip card is issued by an issuing bank, the PIN is determined beforehand and stored in the memory of the chip card. The PIN can be changed by the account-owner (referred to as a "customer") by establishing an online connection to the backend systems maintained by an issuing bank through an ATM. In fact, in some arrangements, card issuers and/or regulators require changes of the PIN periodically in order to strengthen security. Chip card interface devices (CCIDs) such as the CCID discussed in patent application Ser. No. 12/752,567 titled "Personal Identification Number Changing System and Method" and discussed below provide an interface with the chip cards, such as, for reading and/or writing data to and/or from the chip card. Unfortunately, some or all data stored on a CCID and/or a chip card is sensitive and, in some cases, compromise of such data would be considered a significant security breach by the customer and the issuing bank. Dishonest individuals could potentially gain access to sensitive data saved on a CCID and/or accessed by a CCID during an interaction between the CCID and the chip card in a variety of ways. For example, in one scheme, a dishonest individual breaks into a housing of a CCID and installs a keylogger device for recording data from any chip card interacting with the CCID.

Therefore, systems, methods, and computer program products are needed to protect sensitive data stored and/or accessed by a CCID, such as sensitive data accessed from an interaction with a chip card.

SUMMARY

According to embodiments of the present invention, systems such as CCIDs, methods, and computer program products are provided for protecting data stored in a CCID in the event of a compromise of the housing of the CCID. The CCID has a housing and a compromise detection system including one or more detection devices configured for detecting a compromise of the housing. The compromise detection system is configured for generating a detection signal indicating the detected compromise. A data protection system is coupled with the compromise detection system and includes a memory device and a processing device coupled with the compromise detection system. The processing device is for receiving the detection signal and erasing data stored on the memory device based on the detection signal in some embodiments. In some embodiments, the processing device also activates a locking function for rendering itself inoperable based on the detection signal. In some embodiments, the data protection system includes a memory device configured for storing some or all the data, and erasing some or all the stored data based at least in part on the received detection signal indicating the compromise. In some such embodiments, the data protection system also includes a processing device coupled with the memory device and the compromise detection system. The processing device is configured for receiving the detection signal from the compromise detection system, analyzing the detection signal to determine whether the detection signal indicates a compromise, and instructing the memory device to erase some or all data stored at the memory device based at least in part on a determination that the detection signal indicates a compromise. In some such embodiments, the processing device is further configured for conditioning the received detection signal before analyzing. In other such embodiments, the memory device is collocated with the processing device on a chip. In other such embodiments, the processing device is disposed on a chip, and the memory device is not disposed on the chip.

In some embodiments, the memory device is coupled with the compromise detection system. In such embodiments, the memory device is further configured for receiving the detection signal generated by the compromise detection system, the detection signal including a command to erase some or all the data stored in the memory device and following the command by erasing some or all the data.

In some embodiments, the processing device includes the memory device. In some such embodiments, the processing device is disposed on a chip. In other such embodiments, the memory device is configured for storing sensitive data and erasing the sensitive data in response to the detection signal indicating the compromise. In some such embodiments, the memory device is further configured for storing non-sensitive data in a non-sensitive data location distinct from a sensitive data location where the sensitive data is stored, erasing the sensitive data in response to the detection signal indicating the compromise, and retaining the non-sensitive data. In other such embodiments, the sensitive data comprises PIN data or key data. In other embodiments, the non-sensitive data comprises application data or log data.

In some embodiments, the data protection system includes a processing device coupled with the compromise detection system, the processing device configured for receiving the detection signal indicating the compromise and activating a locking function configured for rendering the processing device inoperable, based at least in part on the received detection signal. In some such embodiments, the processing device also includes, after receiving the detection signal, analyzing the detection signal to determine whether the detection signal indicates a compromise. In some such embodiments, the compromise detection system also includes a detection processing device coupled with the one or more detection devices. In such embodiments, the detection processing device is configured for receiving, from the one or more detection devices, a raw signal indicating a compromise and generating the detection signal indicating the compromise, based at least in part on the raw signal. In some such embodiments, the detection processing device is further configured for generating the detection signal indicating the compromise, the detection signal comprising instructions for activating the locking function configured for rendering the processing device of the data protection system inoperable.

According to embodiments of the present invention, a method for protecting data stored at a chip card interface device (CCID) in the event of a compromise includes detecting, by one or more detection devices of a compromise detection system, a compromise of a housing of the CCID, generating, by the compromise detection system, a detection signal indicating the compromise, receiving, at a data protection system, the detection signal indicating the compromise, and protecting, by the data protection system, data stored at the CCID based at least in part on the received detection signal indicating the compromise. In some embodiments, the method also includes storing, by a memory device of the data protection system, some or all the data. In such embodiments, protecting the data stored at the CCID includes erasing, by the memory device, some or all the stored data based at least in part on the received detection signal indicating the compromise. In some such embodiments, the method also includes receiving, at a processing device of the data protection system, the detection signal from the compromise detection system, analyzing, by the processing device, the detection signal to determine whether the detection signal indicates a compromise, and instructing, by the processing device, the memory device to erase some or all data stored at the memory device based at least in part on a determination that the detection signal indicates a compromise. In some such embodiments, the method also includes conditioning, by the processing device, the received detection signal before analyzing. In other such embodiments, the memory device is collocated with the processing device on a chip. In other such embodiments, the processing device is disposed on a chip, and the memory device is not disposed on the chip.

In some embodiments, the method also includes receiving, at the memory device, the detection signal generated by the compromise detection system, the detection signal including a command to erase some or all the data stored in the memory device and following, by the memory device, the command by erasing some or all the data.

In some embodiments, the processing device comprises the memory device. In some such embodiments, the processing device is disposed on a chip. In other such embodiments, the method also includes storing, at the memory device, sensitive data and erasing, by the memory device, the sensitive data in response to the detection signal indicating the compromise. In some such embodiments, the method also includes storing, at the memory device, non-sensitive data in a non-sensitive data location distinct from a sensitive data location where the sensitive data is stored, erasing, by the memory device, the sensitive data in response to the detection signal indicating the compromise, and retaining, at the memory device, the non-sensitive data. In other such embodiments, the sensitive data comprises PIN data or key data. In yet other such embodiments, the non-sensitive data comprises application data or log data.

In some embodiments, the method also includes receiving, at a processing device coupled with the compromise detection system, the detection signal indicating the compromise. In such embodiments, protecting includes activating, by the processing device, a locking function configured for rendering the processing device inoperable, based at least in part on the received detection signal. In some such embodiments, after receiving the detection signal, analyzing, by the processing device, the detection signal to determine whether the detection signal indicates a compromise. In some such embodiments, the method also includes receiving from the one or more detection devices, at a detection processing device of the compromise detection system, the detection processing device coupled with the one or more detection devices, a raw signal indicating a compromise and generating, by the detection processing device, the detection signal indicating the compromise, based at least in part on the raw signal. In some such embodiments, the detection signal comprises instructions for activating the locking function configured for rendering the processing device of the data protection system inoperable.

According to embodiments of the present invention, a computer program product includes a non-transitory computer-readable medium including computer-readable instructions for execution by a chip card interface device (CCID). The instructions are configured for protecting data stored in the CCID in the event of a compromise and include instructions for detecting, by one or more detection devices of a compromise detection system, a compromise of a housing of the CCID, instructions for generating, by the compromise detection system, a detection signal indicating the compromise, instructions for receiving, at a data protection system, the detection signal indicating the compromise, and instructions for protecting, by the data protection system, data stored at the CCID based at least in part on the received detection signal indicating the compromise. In some such embodiments, the instructions also include instructions for storing, by a memory device of the data protection system, some or all the data. In such embodiments, the instructions for protecting the data stored at the CCID include instructions for erasing, by the memory device, some or all the stored data based at least in part on the received detection signal indicating the compromise. In some such embodiments, the instructions also include instructions for receiving, at a processing device of the data protection system, the detection signal from the compromise detection system. The instructions also include instructions for analyzing, by the processing device, the detection signal to determine whether the detection signal indicates a compromise and instructions for instructing, by the processing device, the memory device to erase some or all data stored at the memory device based at least in part on a determination that the detection signal indicates a compromise. In some such embodiments, the instructions also include instructions for conditioning, by the processing device, the received detection signal before analyzing.

In some embodiments, the instructions also include instructions for receiving, at the memory device, the detection signal generated by the compromise detection system, the detection signal including a command to erase some or all the data stored in the memory device and instructions for following, by the memory device, the command by erasing some or all the data.

In some embodiments, the instructions for storing include instructions for storing, at the memory device, sensitive data, and the instructions for erasing include instructions for erasing, by the memory device, the sensitive data in response to the detection signal indicating the compromise. In some such embodiments, the instructions for storing include instructions for storing, at the memory device, non-sensitive data in a non-sensitive data location distinct from a sensitive data location where the sensitive data is stored and instructions for retaining, at the memory device, the non-sensitive data.

In some embodiments, the instructions also include instructions for receiving, at a processing device coupled with the compromise detection system, the detection signal indicating the compromise, and the instructions for protecting including instructions for activating, by the processing device, a locking function configured for rendering the processing device inoperable, based at least in part on the received detection signal. In some such embodiments, the instructions also include instructions for, after receiving the detection signal, analyzing, by the processing device, the detection signal to determine whether the detection signal indicates a compromise. In some such embodiments, the instructions also include instructions for receiving from the one or more detection devices, at a detection processing device of the compromise detection system, the detection processing device coupled with the one or more detection devices, a raw signal indicating a compromise and instructions for generating, by the detection processing device, the detection signal indicating the compromise, based at least in part on the raw signal. In some such embodiments, the detection signal comprises instructions for activating the locking function configured for rendering the processing device of the data protection system inoperable.

According to embodiments of the present invention, a chip card interface device (CCID) is configured for protecting data stored at the CCID in the event of a compromise and includes a housing and a compromise detection system including one or more detection devices configured for detecting a compromise of the housing, the compromise detection system configured for generating a detection signal indicating the detected compromise. The CCID also includes a data protection system coupled with the compromise detection system, the data protection system including a memory device configured for storing some or all the data and a processing device coupled with the compromise detection system. The processing device is configured for receiving the detection signal indicating the compromise, and the memory device is further configured for erasing some or all the stored data based at least in part on the received detection signal indicating the compromise. The processing device is further configured for activating a locking function configured for rendering the processing device inoperable, based at least in part on the received detection signal.

BRIEF DESCRIPTION OF THE DRAWINGS

Figure 1:
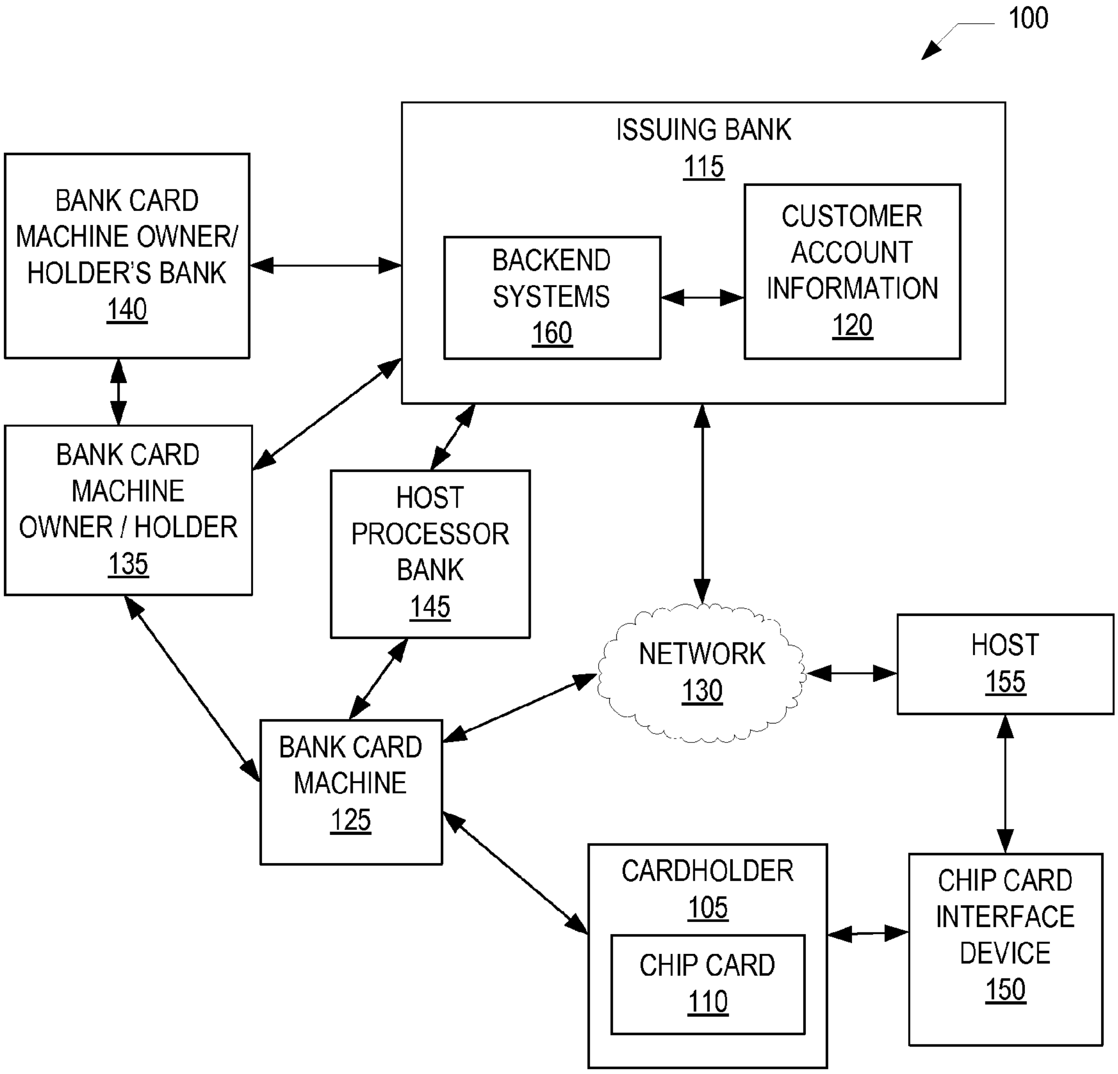

Having thus described embodiments of the invention in general terms, reference will now be made to the accompanying drawings, which are not necessarily drawn to scale, and wherein:

FIG. 1 is a block diagram of one embodiment of a chip card system.

Figure 2:
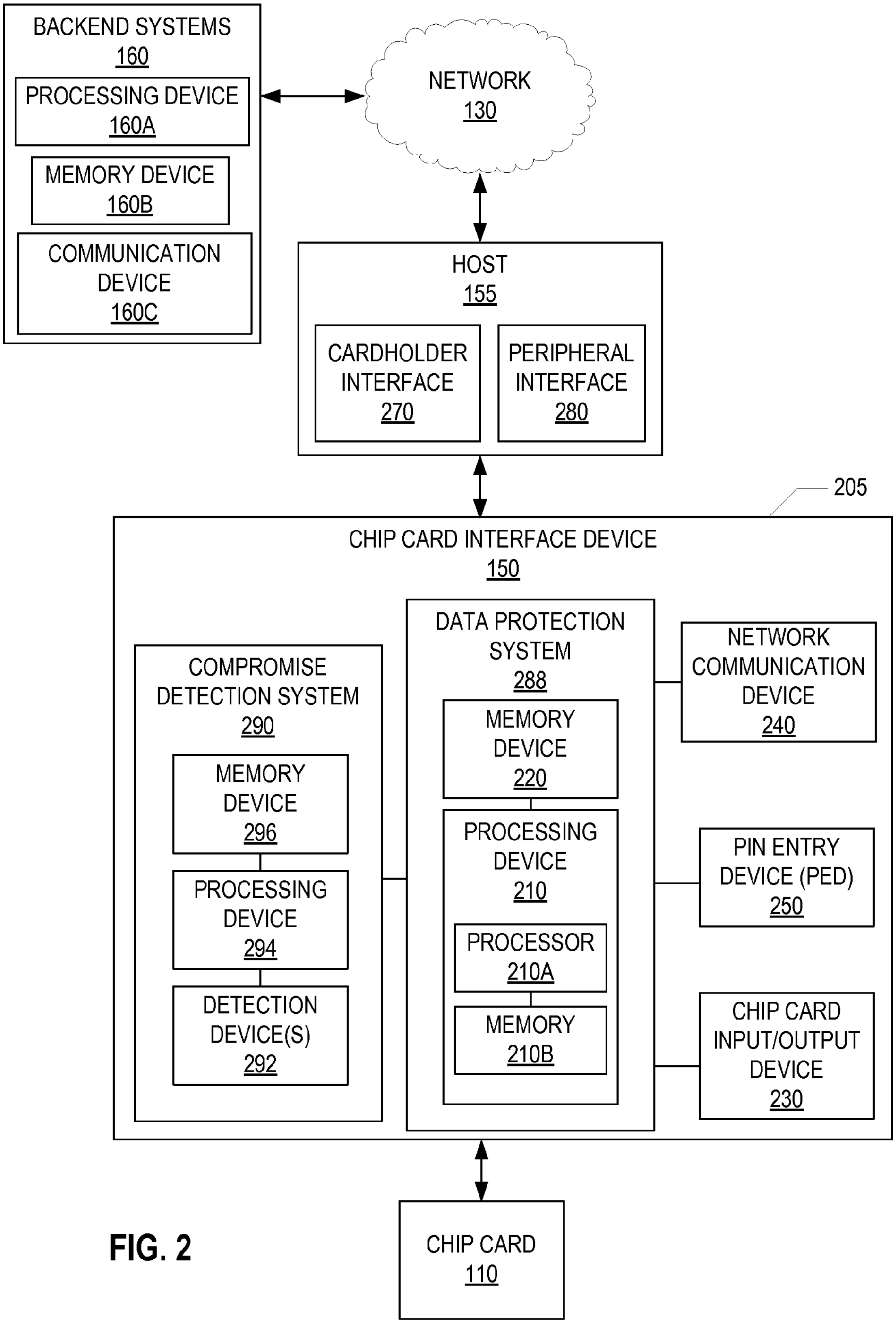

FIG. 2 is a block diagram of one embodiment of a chip card interface device (CCID) communicating with backend systems maintained by an issuing bank across a network and via a host.

Figure 3:
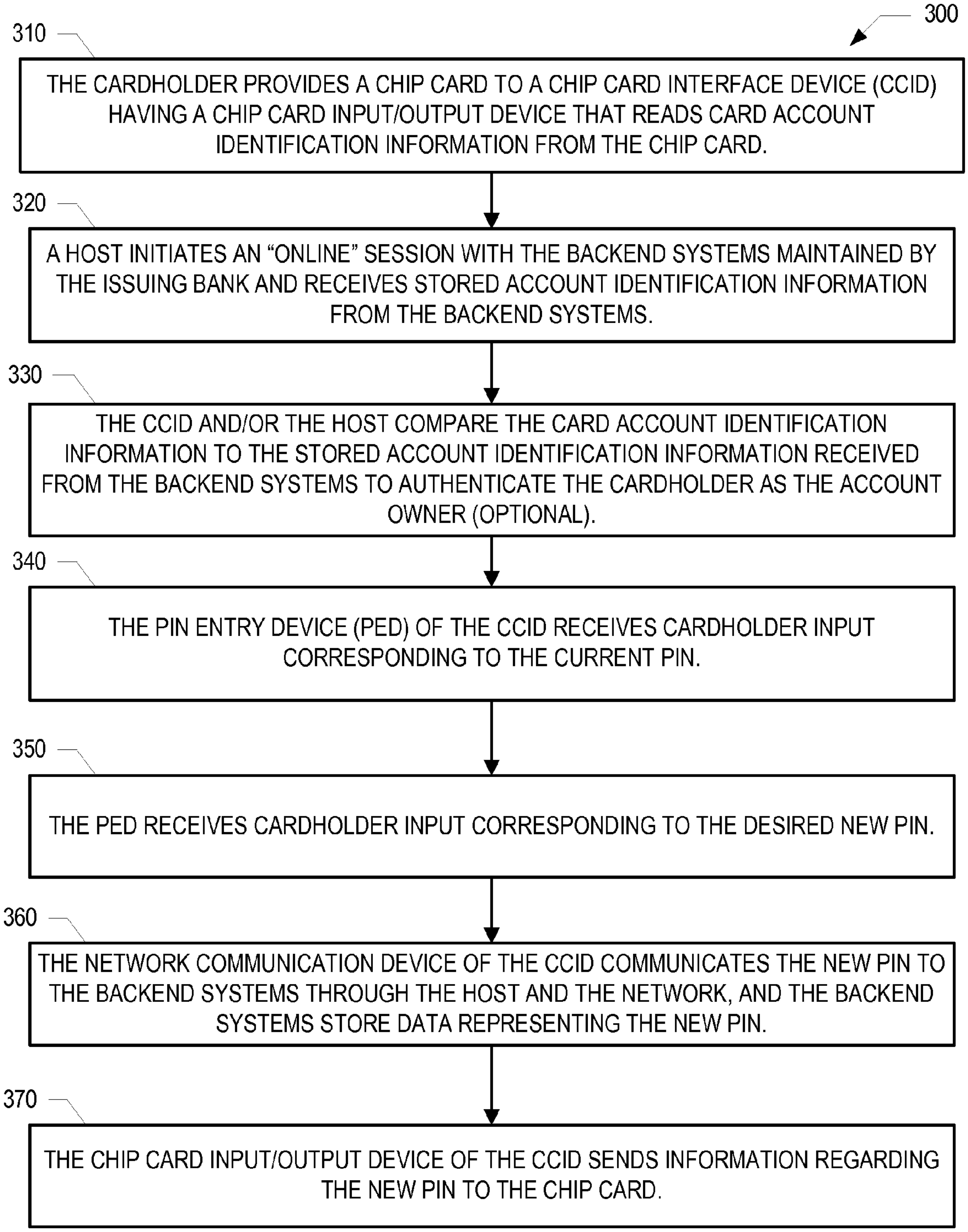

FIG. 3 is a flowchart illustrating one embodiment of the personal identification number changing method.

Figure 4:
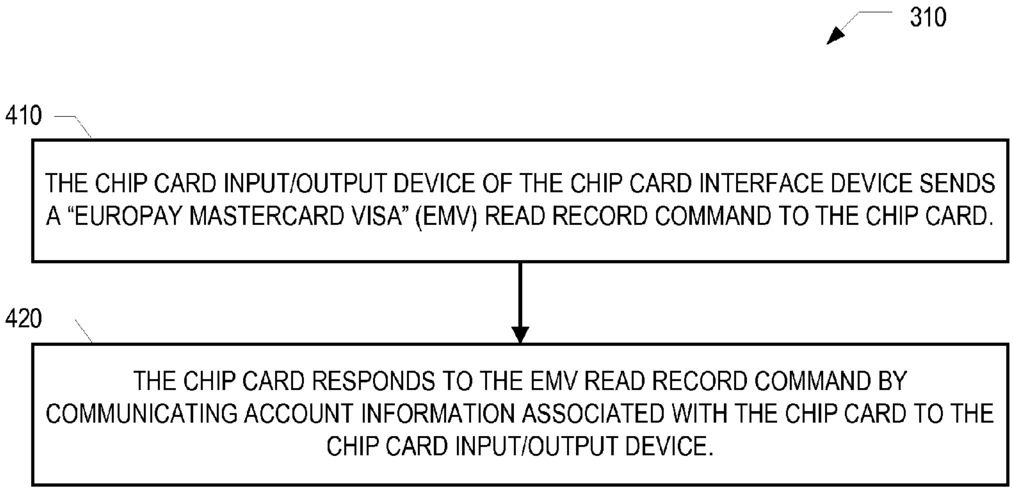

FIG. 4 is a flowchart illustrating one embodiment of substeps regarding reading card account identification information.

Figure 5:
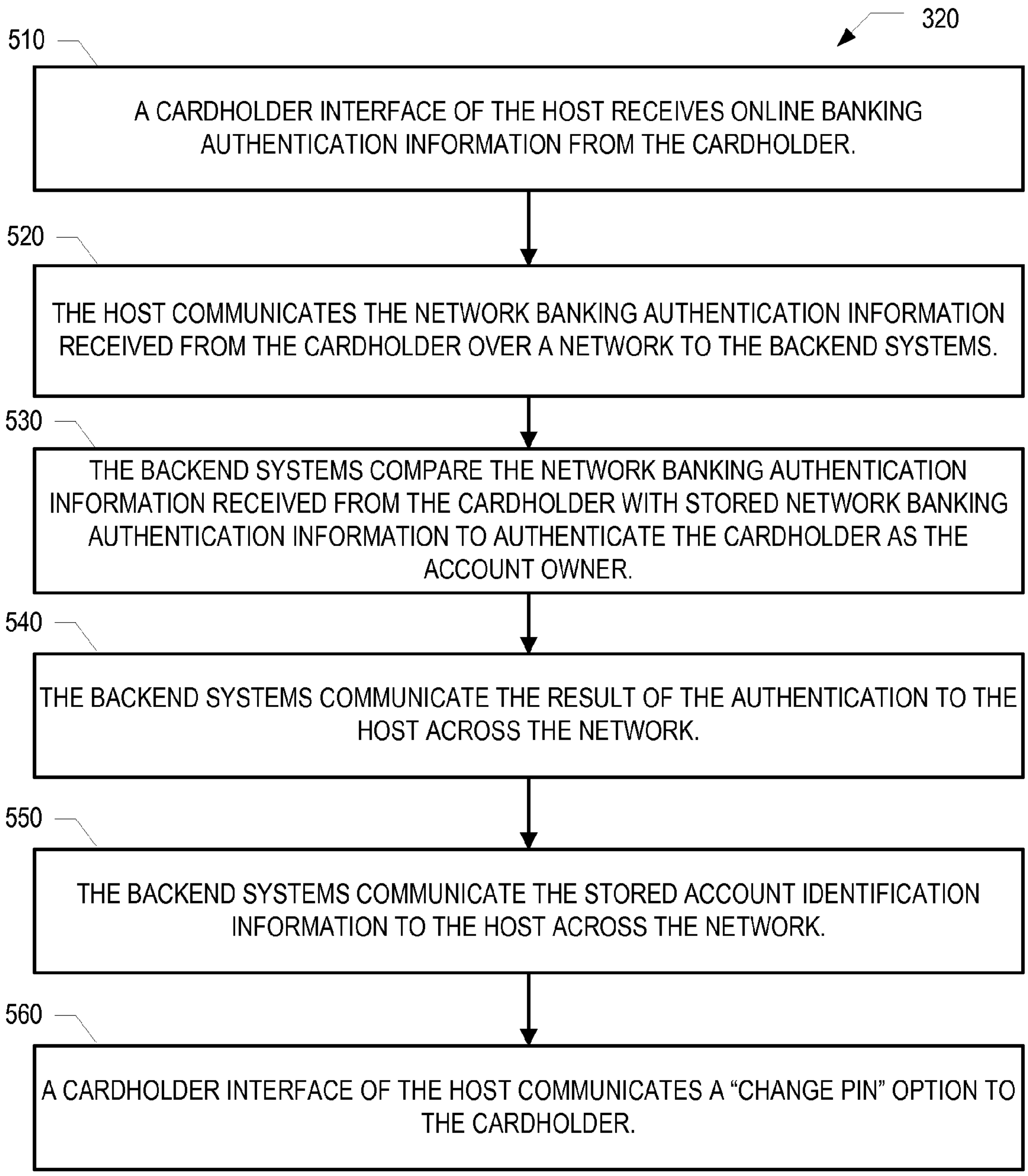

FIG. 5 is a flowchart illustrating one embodiment of substeps regarding initiating an "online" session with the backend systems maintained by the issuing bank.

Figure 6:
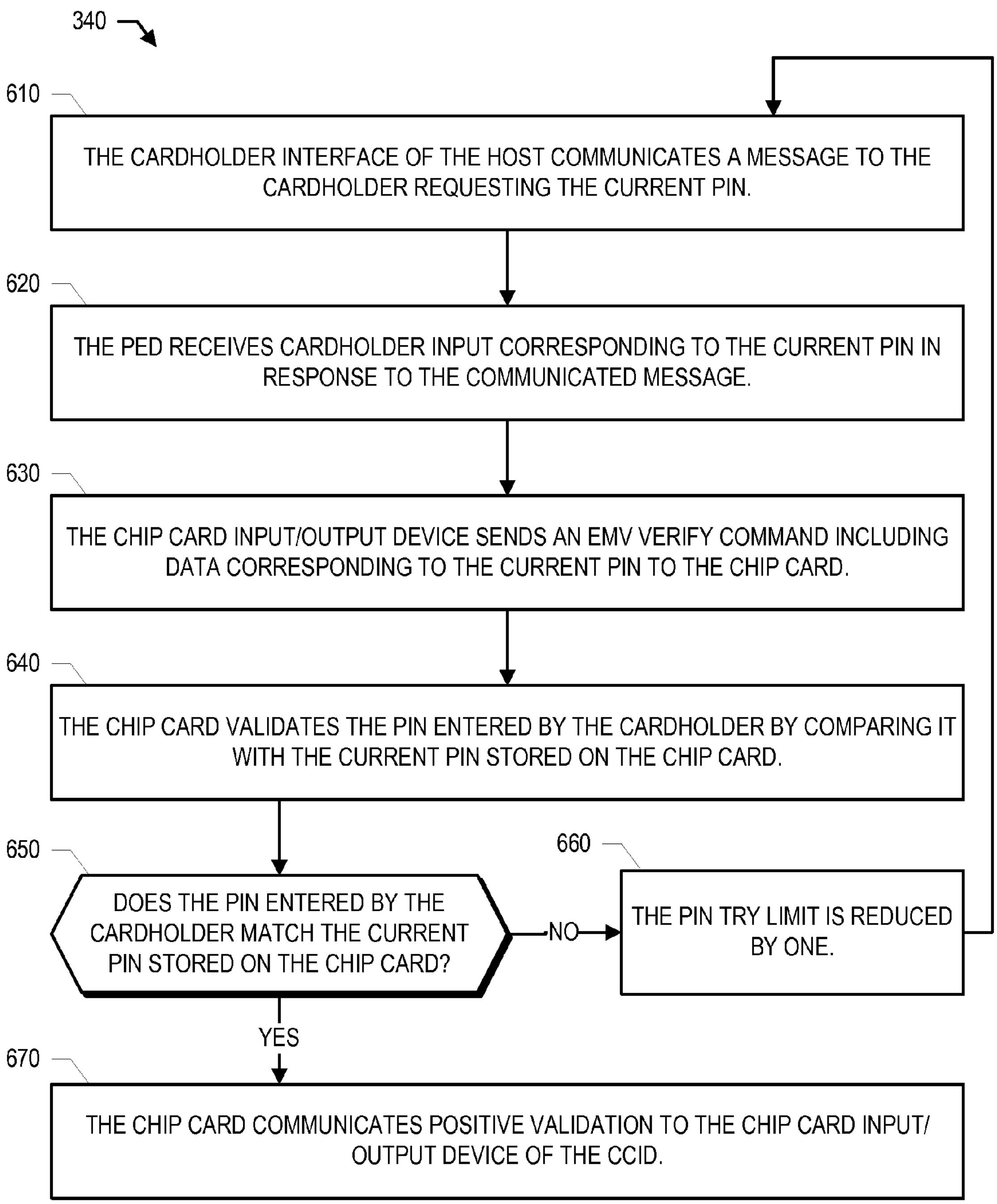

FIG. 6 is a flowchart illustrating one embodiment of substeps regarding receiving cardholder input corresponding to the current PIN.

Figure 7:
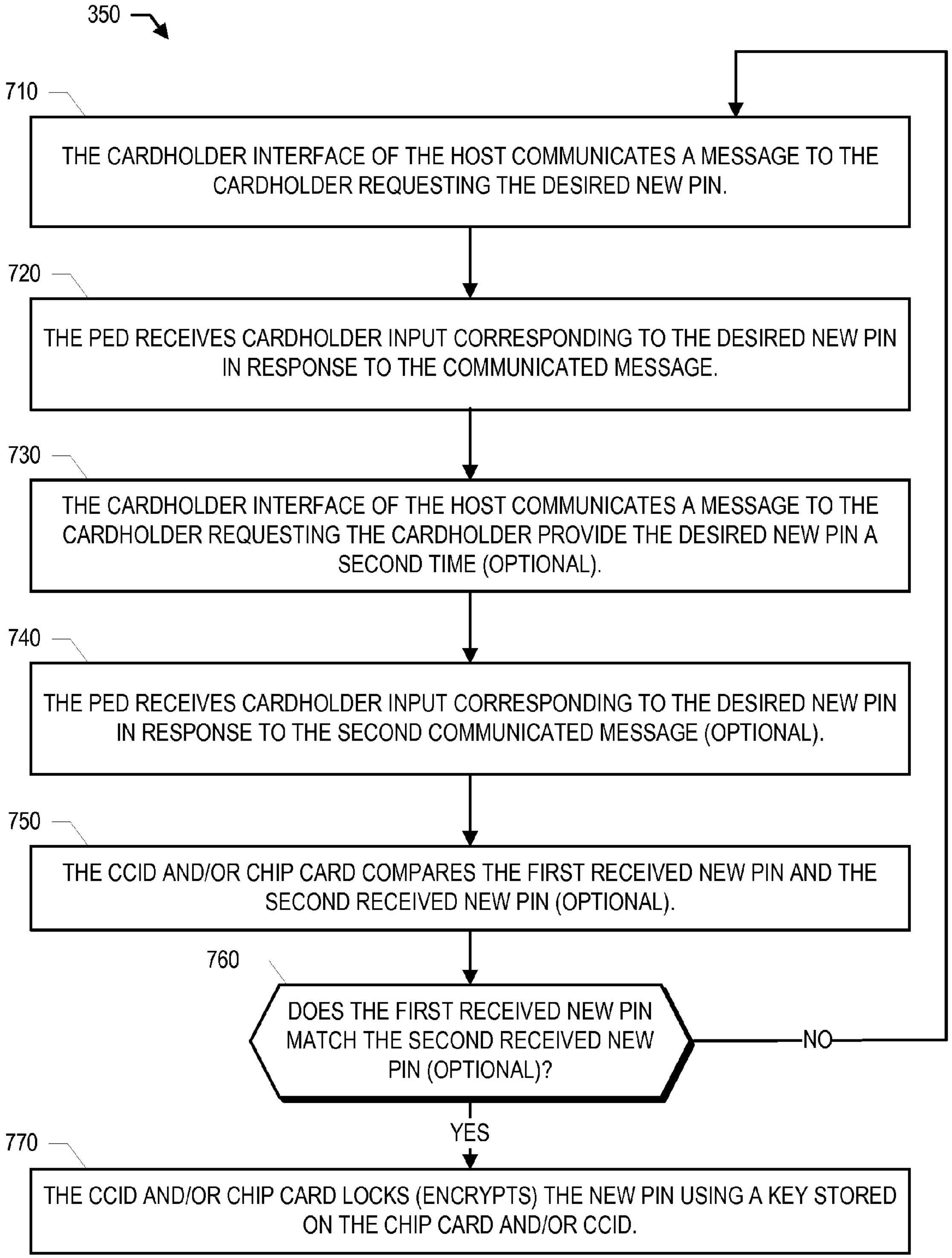

FIG. 7 is a flowchart illustrating one embodiment of substeps regarding receiving cardholder input corresponding to the desired new PIN.

Figure 8:
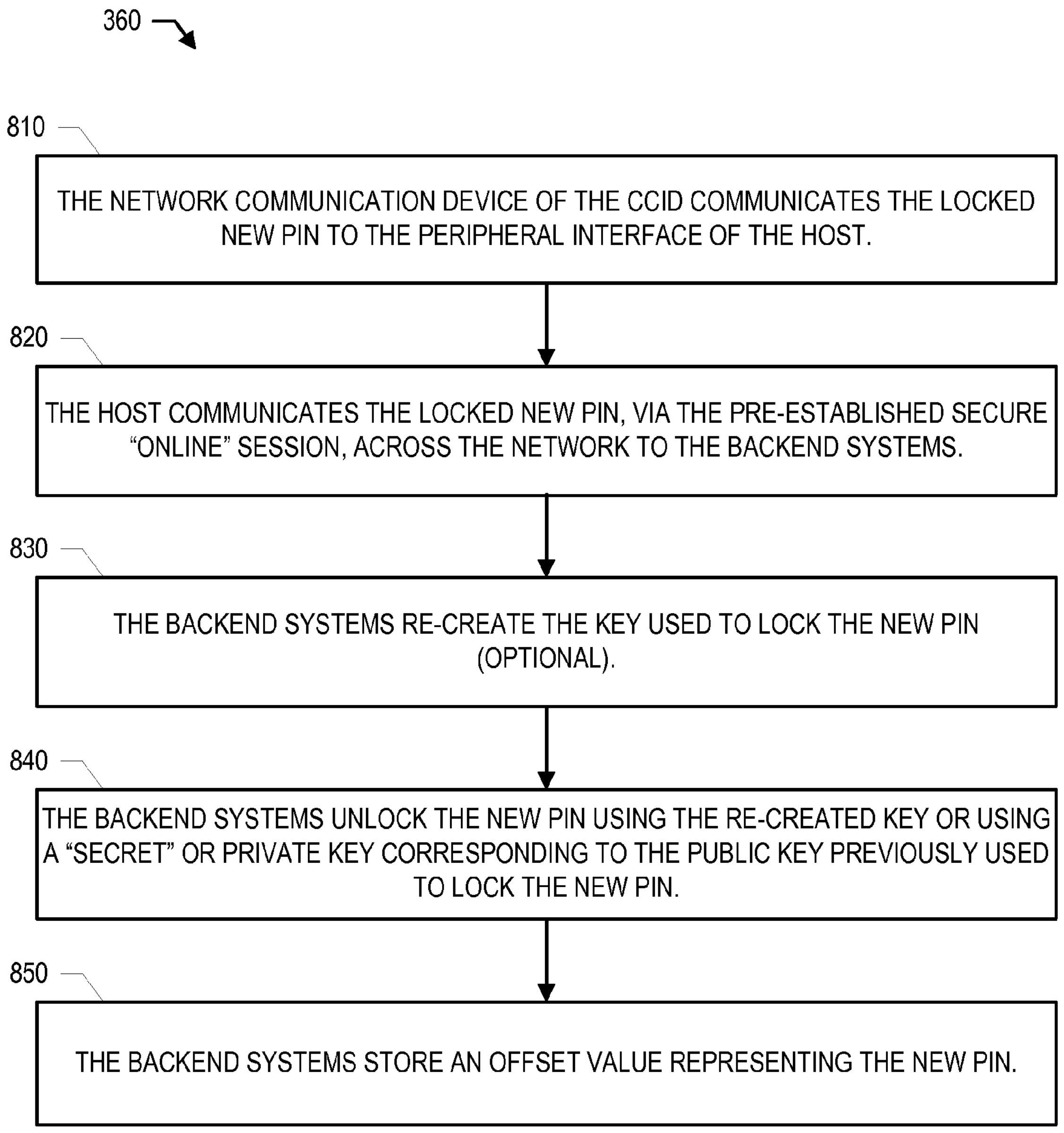

FIG. 8 is a flowchart illustrating one embodiment of substeps regarding communicating the new PIN to and storing the new PIN at the backend systems.

Figure 9:
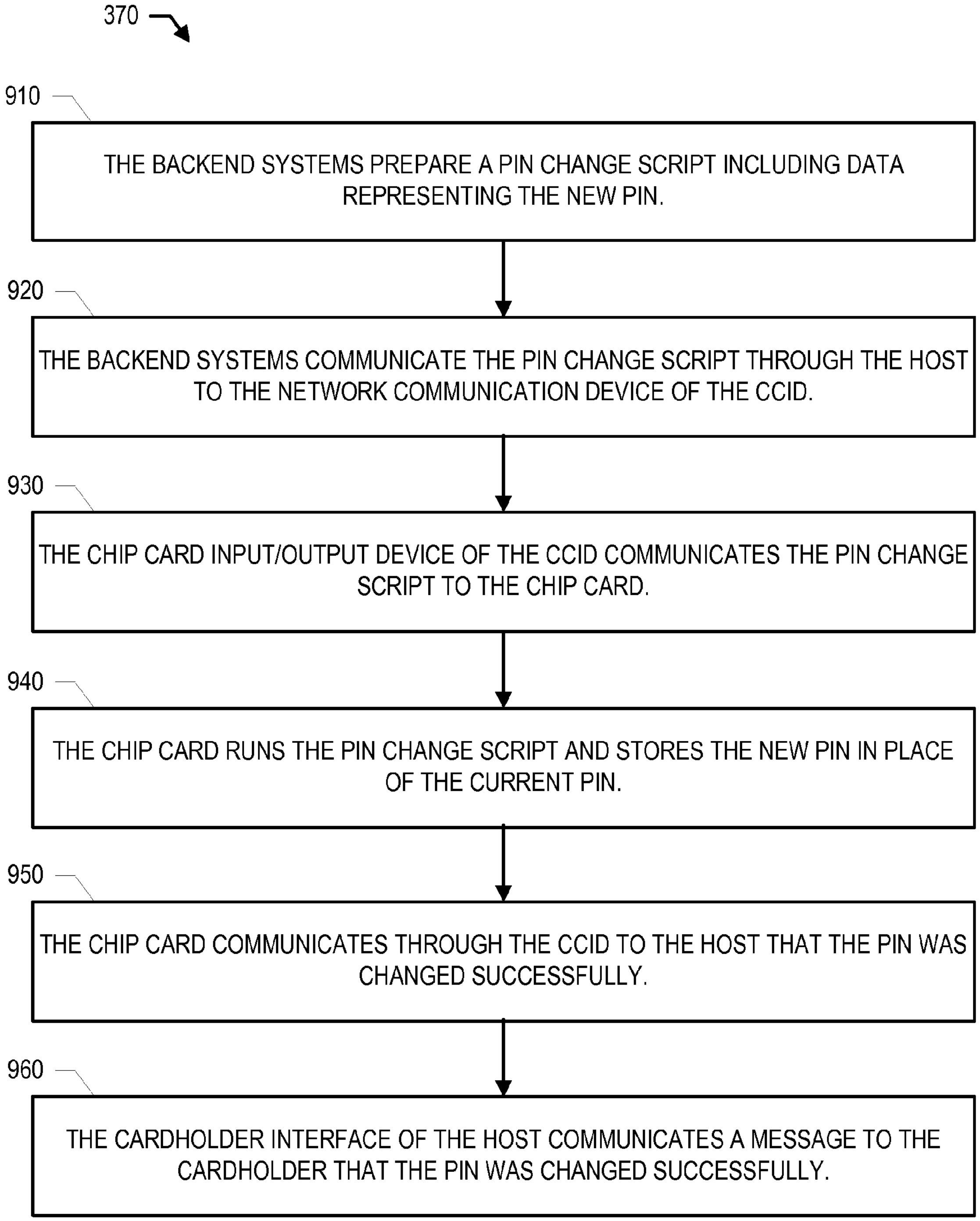

FIG. 9 is a flowchart illustrating one embodiment of writing the new PIN to the chip card.

Figure 10:
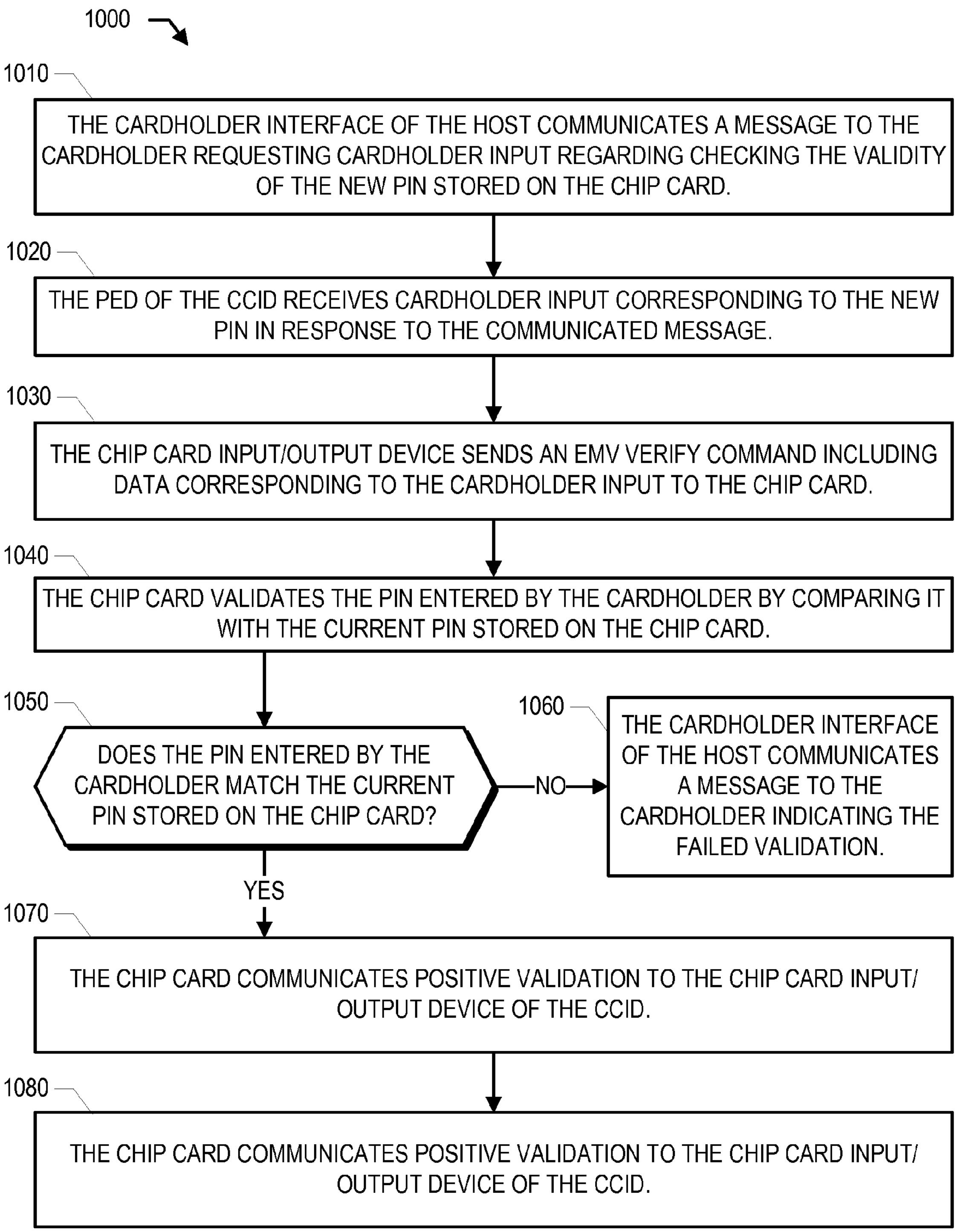

FIG. 10 is a flowchart illustrating one embodiment of a stored PIN checking method.

Figure 11:
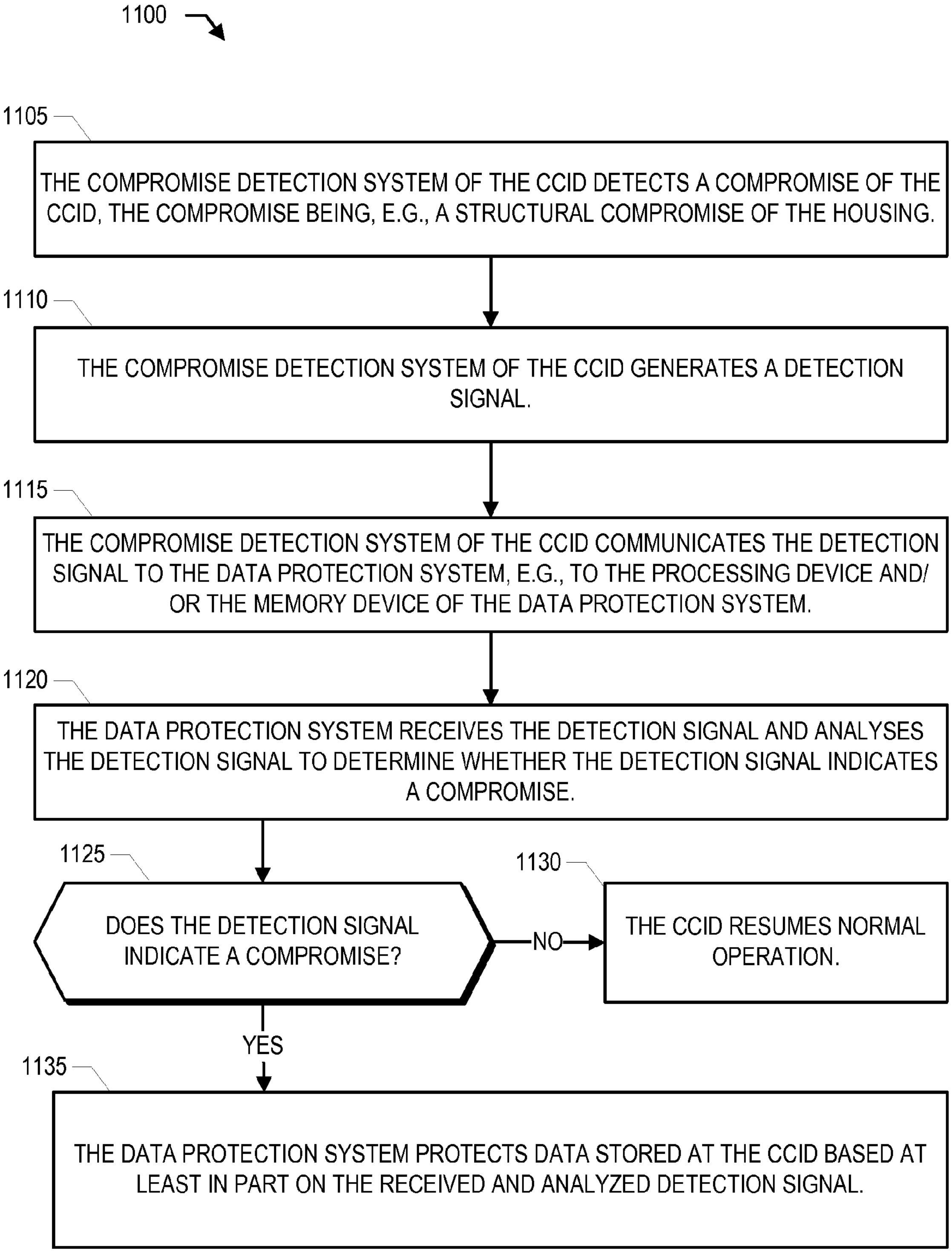

FIG. 11 is a flowchart illustrating one embodiment of a method for protecting data stored in a CCID in the event of compromise.

Figure 12:
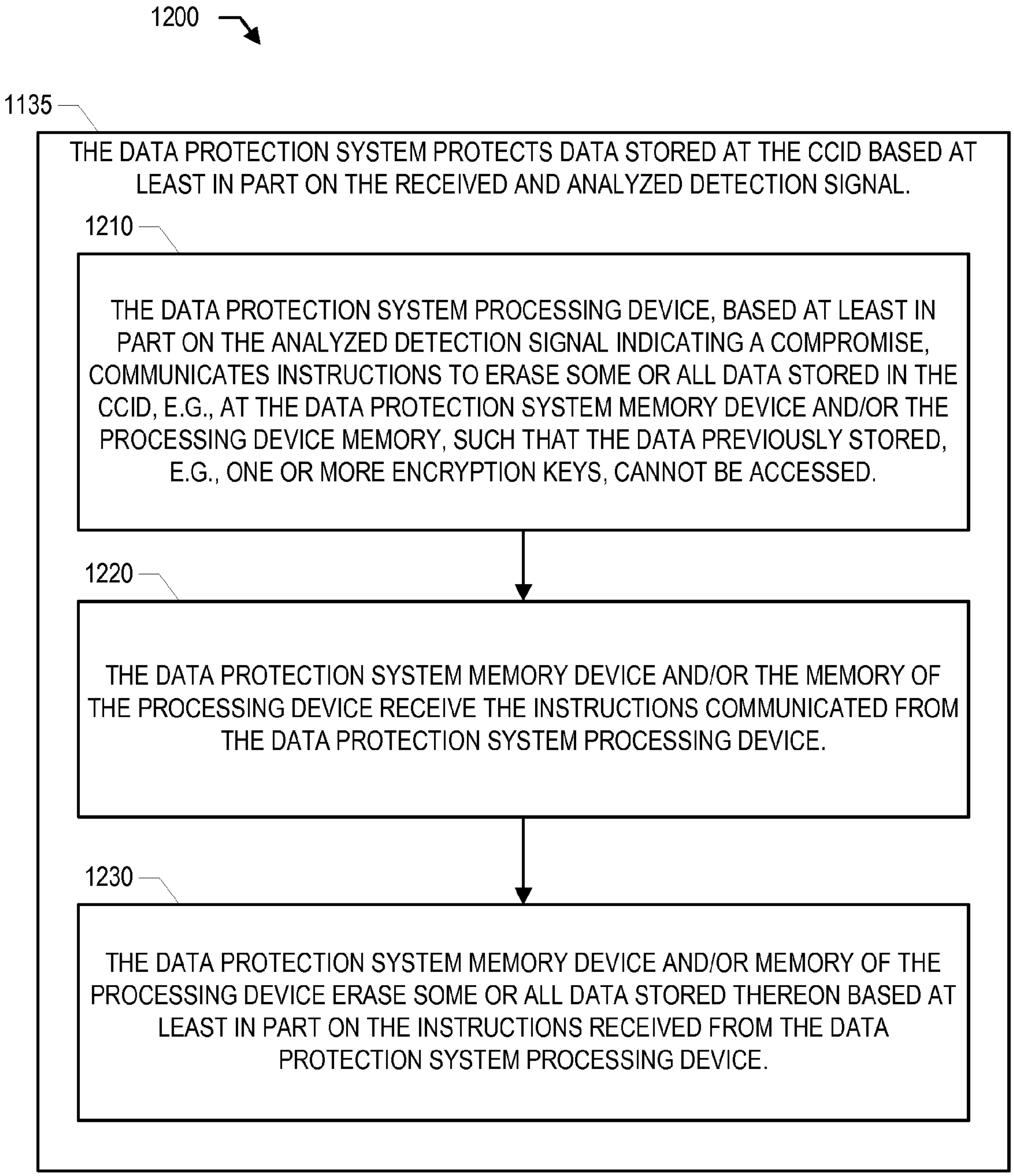

FIG. 12 is a flowchart illustrating one embodiment of a method for erasing data stored in the CCID in the event of compromise.

Figure 13:
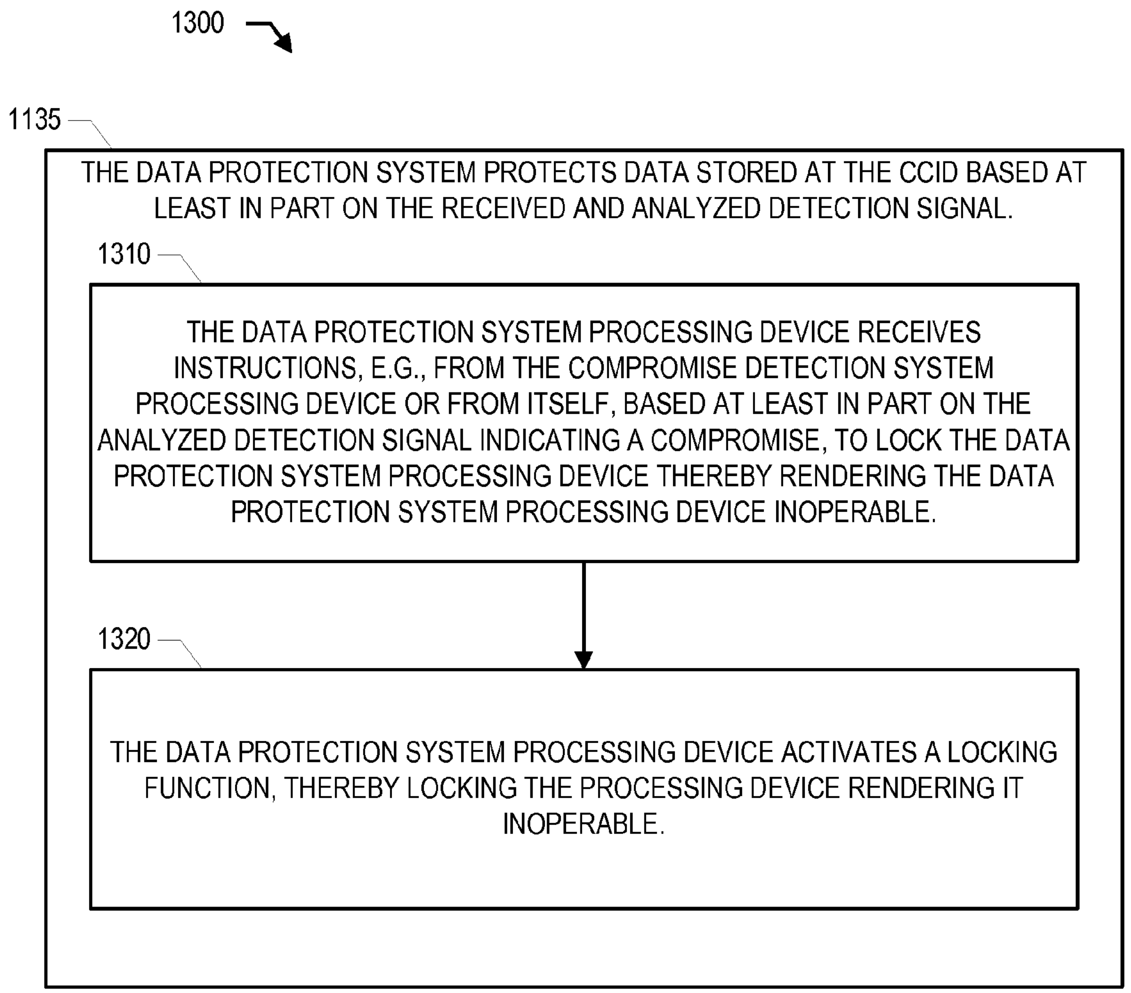

FIG. 13 is a flowchart illustrating one embodiment of a method for locking the processing device of the CCID in the event of compromise.

Figure 14:
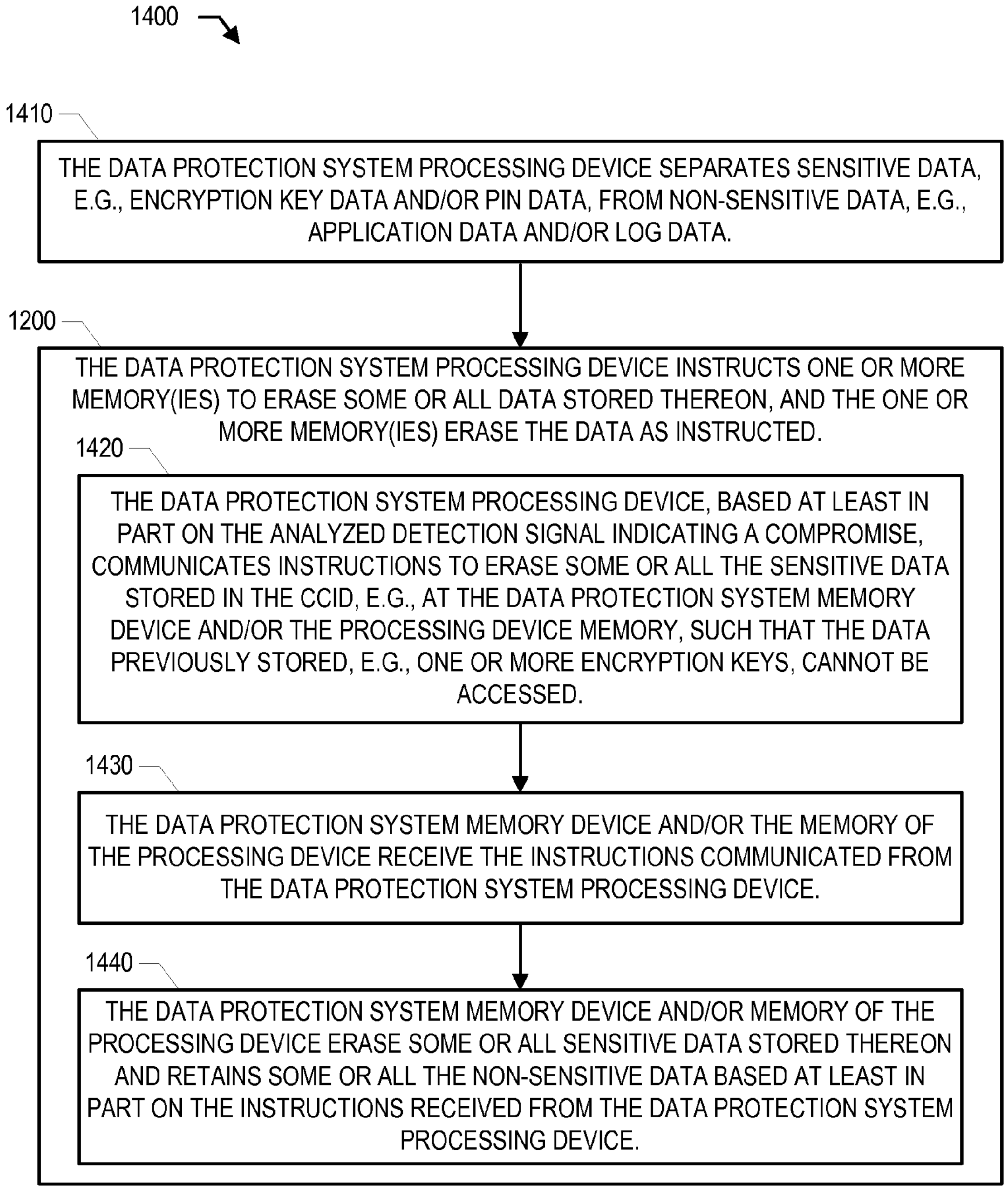

FIG. 14 is a flowchart illustrating one embodiment of a method for erasing only sensitive data stored at the CCID.

Figure 15:
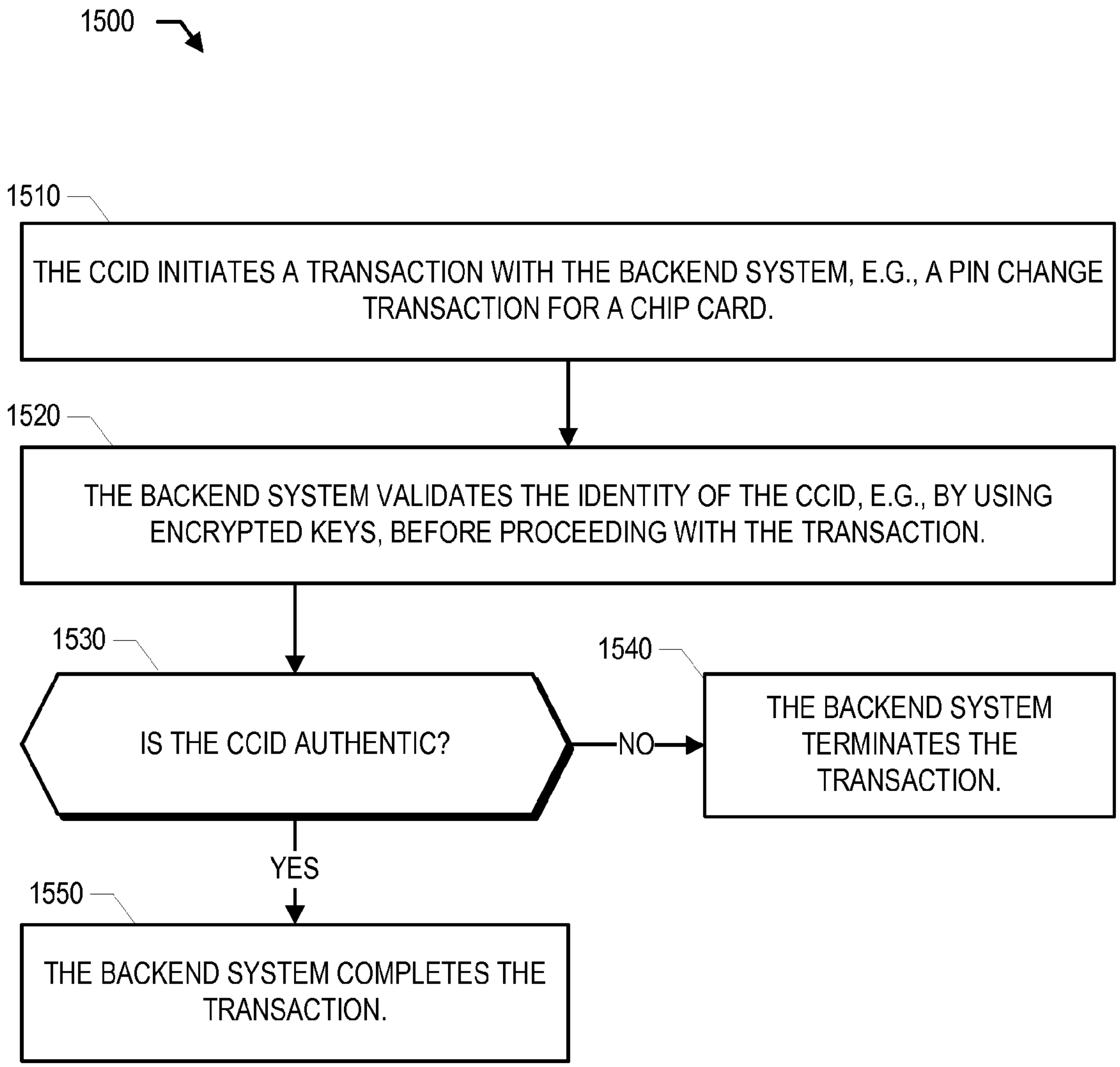

FIG. 15 is a flowchart illustrating one embodiment of a method for authenticating the CCID.

Figure 16:
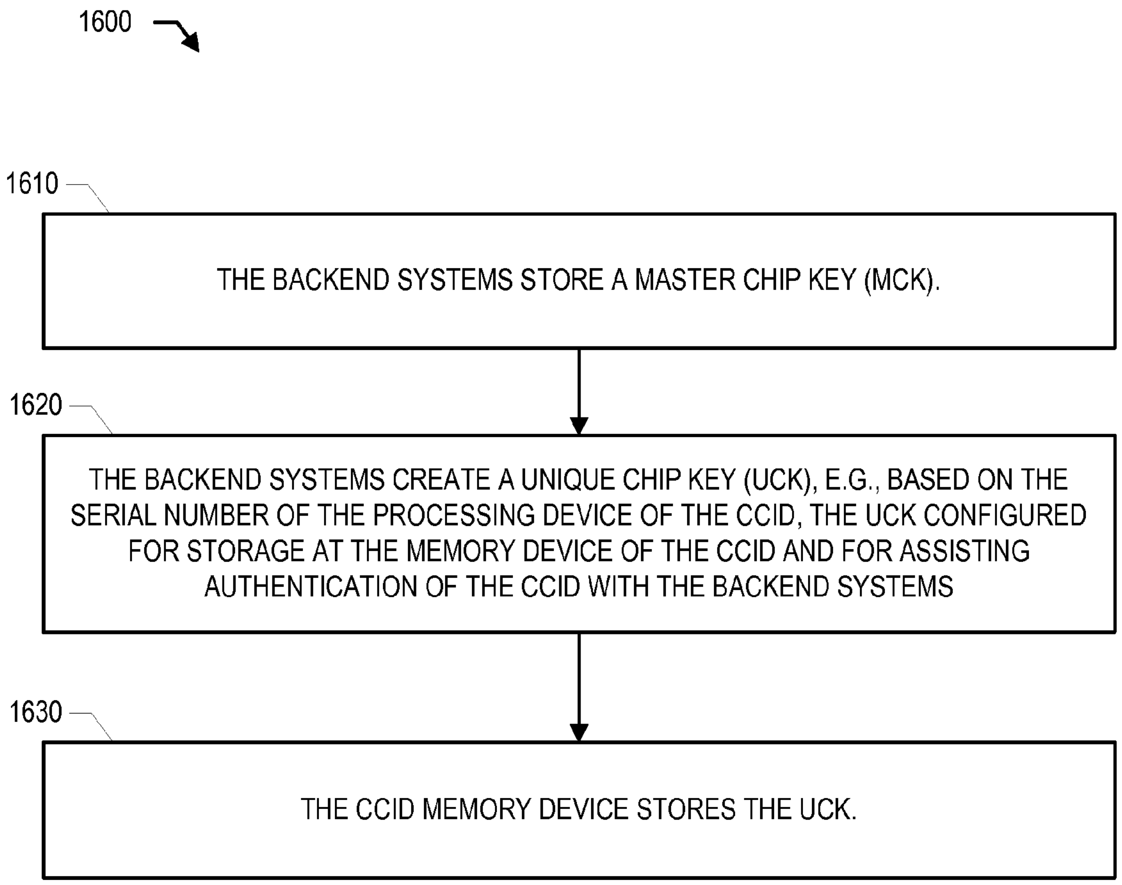

FIG. 16 is a flowchart illustrated one embodiment of a method for setting up authentication.

Figure 17A:
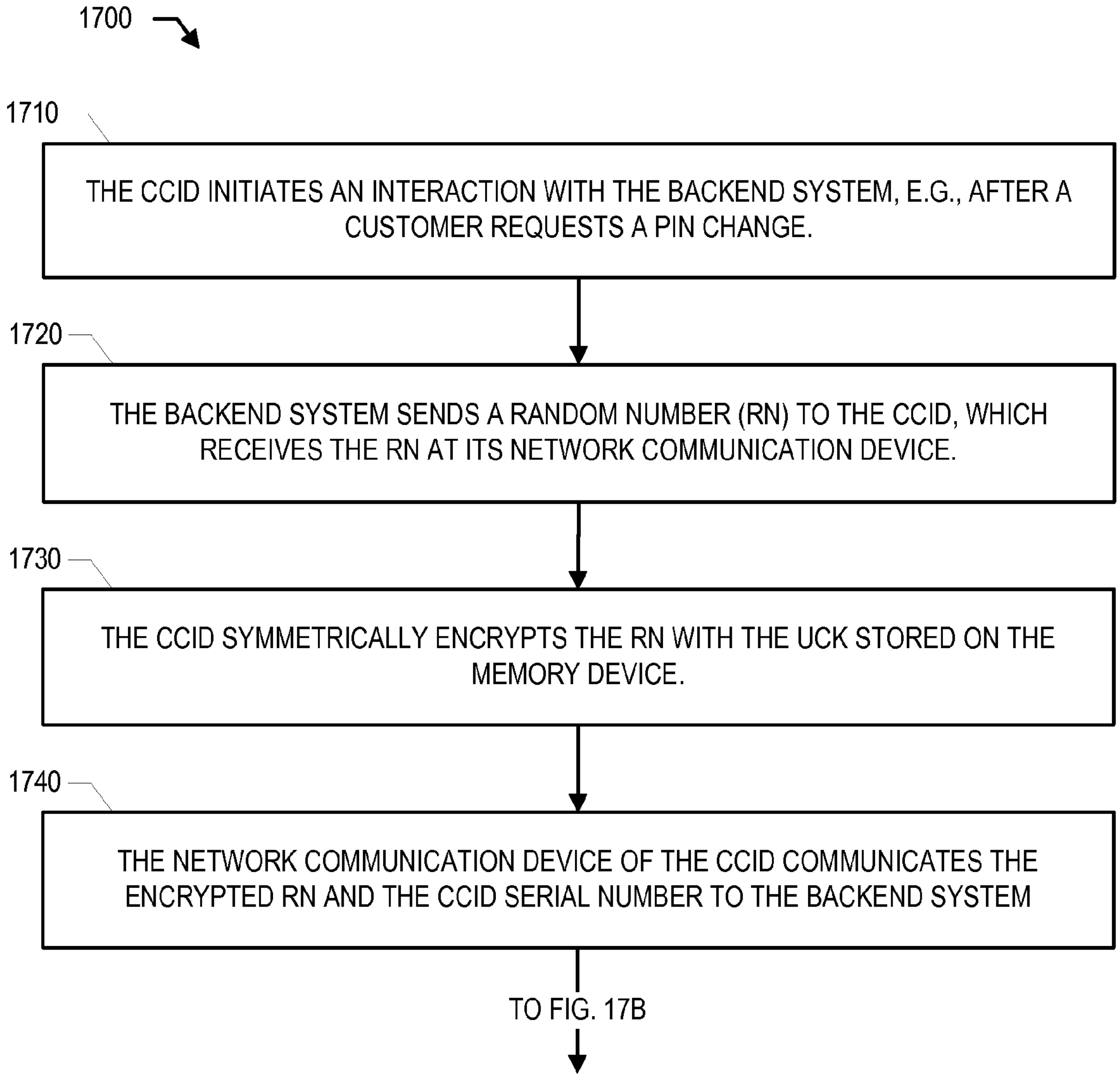
Figure 17B:
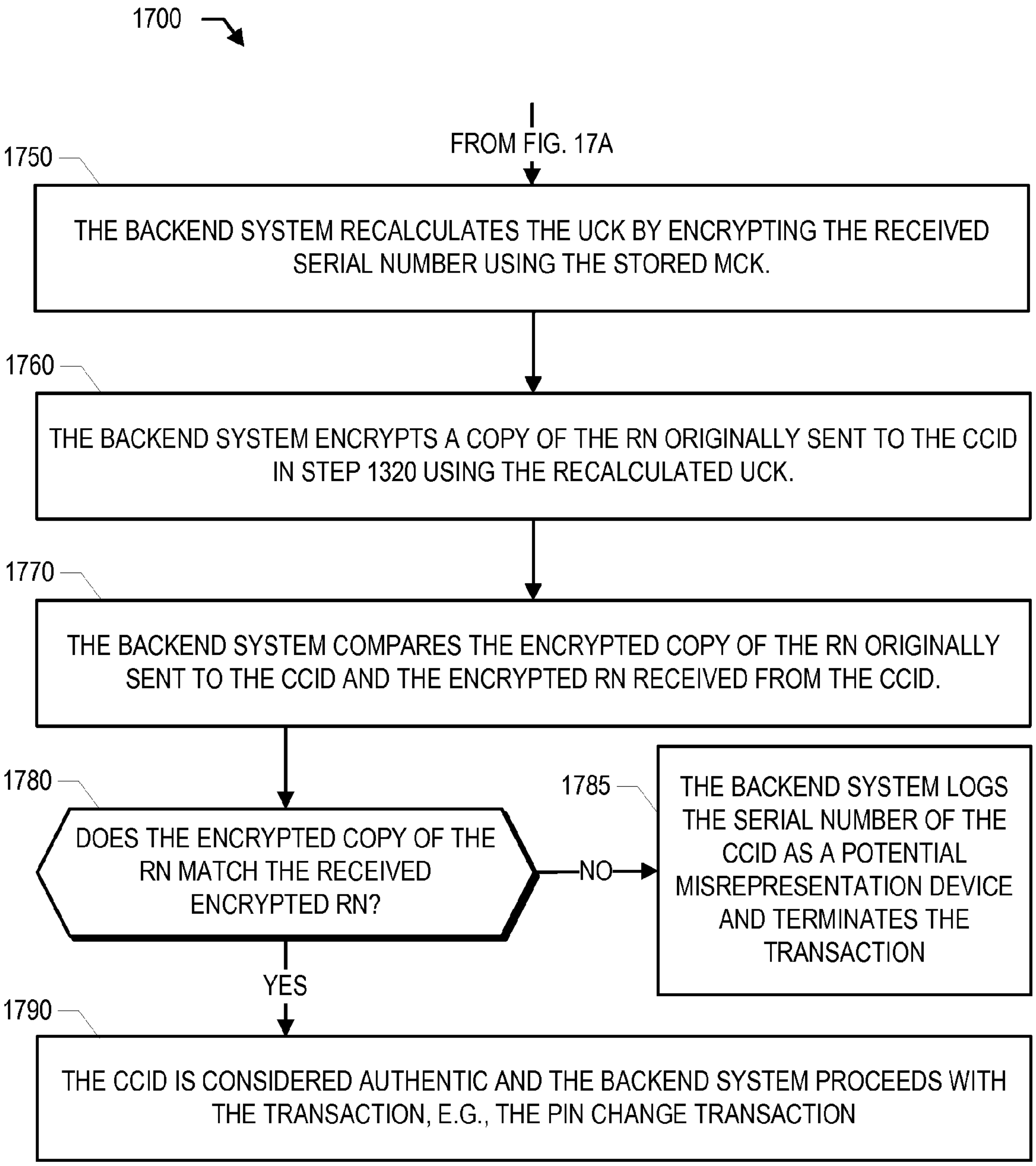

FIGS. 17A and 17B are flowcharts illustrating one embodiment of a method for authenticating the CCID.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

According to embodiments of the present invention, systems such as CCIDs, methods, and computer program products are provided for protecting data stored in a CCID in the event of a compromise of the housing of the CCID. The CCID has a housing and a compromise detection system including one or more detection devices configured for detecting a compromise of the housing. The compromise detection system is configured for generating a detection signal indicating the detected compromise. A data protection system is coupled with the compromise detection system and includes a memory device and a processing device coupled with the compromise detection system. The processing device is for receiving the detection signal and erasing data stored on the memory device based on the detection signal in some embodiments. In some embodiments, the processing device also activates a locking function for rendering itself inoperable based on the detection signal.

As used herein, unless specifically limited by the context, the term “transaction” may refer to a purchase of goods or services, a withdrawal of funds, an electronic transfer of funds, a payment transaction, a credit transaction, a PIN change transaction, any other interaction between a CCID and a bank, such as a server and/or backend system of a bank, or any other interaction involving a bank account. As used herein, a “bank card” refers to a credit card, debit card, ATM card, check card, or the like, and a “bank account” refers to a credit account, debit account, deposit account, checking account, or the like. Although the phrases “bank card” and “bank account” include the term “bank,” the card need not be issued by a bank, and the account need not be maintained by a bank and may instead be issued by and/or maintained by other financial institutions. As discussed above, as used herein the terms “chip card” or “smart card” refer to a bank card having one or more electronic devices included in or on the card. The electronic device(s) may be or include processing device(s), memory device(s), communication device(s), the like, or any other electronic device(s).

As used herein, a “processing device” generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. Further, in some embodiments, a processing device includes both a processor and a collocated or proximally located memory, that is, both located either on a single device, such as a chip, or multiple devices, such as multiple chips, proximate one another.

As used herein, a “communication device” generally includes a modem, server, transceiver, and/or other device for communicating with other devices directly or via a network, and/or a user interface for communicating with one or more users. As used herein, a “user interface” generally includes a display, mouse, keyboard, button, touchpad, touch screen, microphone, speaker, LED, light, joystick, switch, buzzer, bell, and/or other user input/output device for communicating with one or more users.

As used herein, a “memory device” generally refers to a device or combination of devices including one or more forms of computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

FIG. 1 illustrates one embodiment of a chip card system 100. The system 100 generally involves a cardholder 105 holding a chip card 110. As described above, the chip card 110 may be, for example, a credit, debit, or other type of card including an electronic device embedded in or on the card. The chip card 110 is used during a transaction involving one or more accounts associated with the chip card 110 and maintained by an issuing bank 115. In a typical bank card transaction, the cardholder 105 is the customer who owns the account maintained by the issuing bank 115. However, in other chip card transactions or attempted chip card transactions, the cardholder 105 is not the customer. For example, the customer may authorize a friend or family member to perform a transaction with the chip card 110, in which case the friend or family member is considered the “cardholder” for purposes herein. In another example, the customer is a victim of a robbery where the robber steals the customer’s chip card 110 and attempts to perform a transaction with the chip card 110.

The issuing bank 115 is the bank or other financial institution that maintains the customer’s bank account, which, as described above, may be a credit account, debit account, or other account. Accordingly, the issuing bank 115 is also, typically, the financial institution that issues the chip card 110. In this regard, the issuing bank 115 includes a memory system housing a datastore of customer account information 120. The memory system housing the customer account information is typically part of or in communication with one or more backend systems 160 maintained by the issuing bank.

A “backend system” is one or more computers or computer-like devices such as one or more server systems, and a backend system typically has one or more processing devices such as a server and typically includes one or more memory devices as well as one or more communication devices.

The customer account information 120 generally includes an account number, an account balance, transaction information about previous transactions, and/or other financial and non-financial information about the customer and the customer’s account. As described in greater detail below, embodiments of the present invention permit customers to change a PIN associated with an account without requiring access to an ATM. In some instances, accounts have more than one associated PIN for various purposes. For example, in one application, an account is given a regular PIN as well as a “panic” PIN for the customer to enter if he or she is being robbed. Generally, the PIN or PINS are stored as part of the customer account information 120 at the backend systems using an offset value that represents the value of the PIN. The PIN(s) are also stored on the chip card 110 associated with one or more accounts and issued by the issuing bank 115. In one embodiment, the PIN is a string of numbers, such as a string of four or six numbers. In other embodiments, however, the PIN may not be a number at all and may include a string of alphabetic or alphanumeric characters and/or other symbols and characters.

In some embodiments, the “Europay MasterCard VISA” (EMV) standard is used as the protocol for communication between the chip card 110 and a chip card-compatible bank card machine 125 or a chip card interface device 150 in accordance with the present invention. In other embodiments other standards of communication are used. EMV is a standard for interoperation of chip cards 110 and chip card-compatible bank card machines 125 such as POS terminals, ATMs and the like that was named for the three companies that originally cooperated to develop the standard. The EMV standard defines the interaction between the chip cards and chip card input/output devices. EMV governed transactions typically utilize cryptographic algorithms generally considered safer than traditional offline magnetic stripe transaction authentication. Types of algorithms used include, but are not limited to, DES, Triple-DES, RSA, SHA, and the like.

The system 100 generally also includes a bank card machine 125. In one embodiment, the bank card machine 125 is an ATM. In other embodiments, the bank card machine 125 is a point-of-sale terminal, such as a bank card terminal at the register of a grocery store or a pay-at-the-pump terminal at a gas station. The bank card machine 125 is configured to communicate with the issuing bank 115 via a network 130. The bank card machine 125 is owned, held, or otherwise associated with a bank card machine owner/holder 135. In one embodiment, the bank card machine owner/holder 135 is the issuing bank 115. For example, many banks have their own ATMs. In such an embodiment, the bank card machine 125 may communicate directly with the issuing bank 115 over the network 130 or through one or more other entities.

In other embodiments, however, the bank card machine owner/holder 135, is another bank or financial institution, a merchant, or the like. In such embodiments, the bank card machine 125 may communicate with the issuing bank 115 through the bank card machine owner/holder 135, the bank card machine owner/holder's bank 140, and/or one or more other entities.

The bank card machine owner/holder 135 may have a bank 140 that maintains a bank account for the bank card machine owner/holder 135. The bank card machine owner/holder's bank 140 may be the same as or different from the issuing bank 115. For example, where the bank card machine 125 is a POS terminal at a merchant's store, the bank card machine owner/holder 135 may be the merchant, and the bank card machine owner/holder's bank 140 may be the receiving bank that maintains the merchant's account and obtains payment from the issuing bank 115 for bank card purchases made at the merchant's store.

In another example, the bank card machine 125 is a kiosk-style ATM owned or leased by a merchant, such as a gas station or convenience store. In such an embodiment, although the bank card machine owner/holder (the "merchant" in this example) 135 may provide the money in the bank card machine 125, the bank card machine 125 may be operated by a host processor bank 145. In such an embodiment, the bank card machine 125 may communicate with the issuing bank 115 through the host processor bank 145. Where the transaction involves a withdrawal of cash from the bank card machine 125, the issuing bank 115 transfers funds to the host processor bank 145 via, for example, an electronic funds transfer, and the host processor bank 145 then transfer the funds via the Automated Clearing House (ACH) to the merchant's bank account maintained by the merchant's bank 140. In this way, the merchant 135 is reimbursed for the funds dispensed at the bank card machine 125.

During some transactions, the bank card machine 125 establishes a connection to the backend systems 160 for various purposes including, potentially, verification of cardholder PIN inputs. Such a connection is considered an "online" transaction, and an "offline" transaction is one in which the bank card machine 125 does not establish a connection with the backend systems 160 of the issuing bank 115.

In order to change the PIN number associated with the account and stored on the chip card 110, a cardholder 105 must either perform an online transaction at the bank card machine 125, which communicates with the issuing bank 115 via one or more of the several pathways discussed in greater detail above, or, the cardholder 105 can use a chip card interface device 150 (CCID) in accordance with embodiments of the present invention. The chip card interface device 150 forms an online connection to the issuing bank 115 via a host 155 such as, but not limited to, a personal computer and through the network 130 such as, but not limited to, the Internet.

The chip card interface device 150 is configured for recognizing the chip carried on or in the chip card 110, reading data from the chip, and writing data to the chip. The chip card interface device 150 is also configured for connecting with the issuing bank 115 via the host 155 and the network 130. For example, the chip card interface device 150 is configured for connecting with a host 155 such as a computer, ATM, POS terminal, mobile telephone or smartphone or the like via a communication protocol, either wired or wireless. For example, in one embodiment, the chip card 110 communicates with the chip card interface device 150, which communicates with a personal computer via a Universal Serial Bus (USB) connection. The chip card interface device 150 is configured to provide local or "offline" authentication of the customer's PIN in some applications, but is configured for making an online authentication during a PIN change process. The device 150 is also configured for providing the cardholder 105 an interface with which to change the PIN(s) saved on the chip card 110 and associated with one or more of the accounts associated with the chip card.

As shown in FIG. 2, the host 155 includes a cardholder interface 270 and a peripheral interface 280 in some embodiments. The cardholder interface 270 is any device configured for interacting with a user, including either communicating to the user, receiving input from the user or both. The cardholder interface 270, in some embodiments, for example is one or more of a display, a keyboard, a keypad, a mouse, a roller ball, a track pad, a touch pad, a touch screen, a speaker, and the like. The peripheral interface 280 is a device and/or software control module configured for connecting with a peripheral using one or more wired or wireless protocols. For example, in one embodiment the peripheral interface is a USB port controlled by a USB controller script running on the host 155. In this example, the CCID 150 network communication device 240 may be a USB interface for coupling with the USB port running on the host 155.

Numerous other entities may also be involved in embodiments of the present invention, but are not shown in FIG. 1 and FIG. 2 discussed below for the sake of clarity. For example, the system may involve an automated clearing house and/or one or more other financial institutions involved in processing bank card transactions, such as POS purchase transactions and ATM transactions.

Furthermore, although only a single representation of a network 130 is illustrated in FIG. 1 and FIG. 2 discussed below, the network 130 may comprise a plurality of separate and discrete networks. For example, the network 130 that is used to communicate information between the issuing bank 115 and the bank card machine 125 may be the same or different than the network 130 used to communicate information between the issuing bank 115 and the chip card interface device 150. The network 130 may include a local area network (LAN), a wide area network (WAN), and/or a global area network (GAN). In this regard, the network 130 may include the Internet, an intranet, an extranet, a telephonic network, and/or a combination of these networks. The network 130 may also include a direct electrical, optical, or wireless connection between one or more of the entities and devices shown in FIGS. 1 and 2.

FIG. 2 illustrates a chip card interface device 150 interacting with a chip card 110 and a network 130. The chip card interface device 150 includes, in some embodiments, a housing 205, a processing device 210 connected to and configured for controlling a memory device 220, a chip card input/output device 230 configured for communicating with the chip card 110, a network communication device 240 configured for communicating with the network 130, and a PIN entry device (PED) 250 configured for receiving cardholder input such as input corresponding to the current PIN associated with the chip card or input corresponding to the cardholder's desired new PIN.

The chip card input/output device 230 is configured for reading data, such as account data corresponding to one or more accounts, from the chip card 110 as well as transmitting data to be updated on the chip card 110. In some embodiments, the chip card 110 includes electrical contacts and the chip card input/output device 230 also includes electrical contacts for coupling with and communicating via the electrical contacts of the chip card 110. For example, in some embodiments, the chip card communicates using the International Organization for Standardization (ISO) 7816 and ISO 7810 standards. In other embodiments, the chip card 110 includes a wireless communication device and the chip card input/output device 230 also includes a wireless communication device for coupling with and communicating via the wireless communication device of the chip card 110. For example, in some embodiments, the chip card communicates using the ISO 14443 standard for contactless smartcard communications, and in other embodiments, other types of communication such as radio frequency identification (RFID) wireless communication is used.

The network communication device 240 is configured for communicating with the network 130 via the host 155, and in some embodiments with the backend systems 160. As mentioned above, the backend systems are or include, in various embodiments, one or more processing devices 160A, one or more memory devices 160B, and one or more communication devices 160C. In some embodiments, the network communication device 240 includes a wired interface for connecting with a personal computer such as a Universal Serial Bus (USB) connection, an IEEE 1394 ("Firewire") protocol connection, or the like. In other embodiments, the network communication device 240 includes a wireless interface for connecting with the cardholder's personal computer such as a Bluetooth device, a Wi-Fi device, a radio frequency communication device, or the like.

The PED 250 is configured for receiving a cardholder current PIN input from the cardholder. The PED 250 is also configured for receiving a cardholder desired PIN input corresponding to the cardholder's desired new PIN. The PED 250, in some embodiments, is part of the chip card interface device 150, and in other embodiments, it is part of the host 155. In yet other embodiments, the PED 250 is a standalone device in communication with the chip card interface device 150. The PED 250 is any input device capable of receiving input from the cardholder indicating a PIN. For example, in one embodiment, the cardholder input device 245 is a nine-digit keypad. In other embodiments, the cardholder input device 245 is a keyboard or included on a keyboard, a touch-screen, or the like.

In some embodiments the CCID 150 includes a data protection system 288 configured for protecting data stored at the CCID in the event of a compromise. As shown in FIG. 2, the data protection system 288, in some embodiments, includes the processing device 210 and the memory device 220. In other embodiments, the processing device and/or the memory device 220 are not included in the data protection system 288, but rather another processing device and/or memory device (not shown) are included in the data protection system 288. As shown, in some embodiments, the processing device 210, as discussed elsewhere herein, includes a processor 210A and a memory 210B, and in some embodiments the processing device is disposed on a chip. In some such embodiments, the processing device 210 and its processor 210A and memory 210B are also disposed on the same chip. In some embodiments, the memory device 220, although part of the data protection system 288, is disposed separate from, but coupled with, the processing device 210. In other words, in some embodiments, the memory device 220 is not collocated with the processing device 210, for example, on a single chip. Thus, in some such embodiments, the data protection system 288 includes more than one memory, for example, the memory 210B of the processing device 210 as well as the memory device 220. Of course, in various embodiments, the various other components are coupled directly with the components of the data protection system 288 despite the illustration of FIG. 2 showing various components coupled with the data protection system 288. For example, in some embodiments discussed herein, the network communication device interacts with the processing device 210. Likewise, in some embodiments discussed herein, the PED 250 and the chip card input/output device 230 interact with the processing device 210. In various embodiments, the various components of the CCID are coupled directly with other components within the CCID regardless of the fact that some components, in some embodiments, are included within other components. In some embodiments, such as those discussed regarding PIN change transactions, the processing device 210 and/or the memory device 220 perform functions other than data protection functions, and in this regard, they are not only used for data protection, but for other functionalities. In some embodiments, processing device 210 and memory device 220 are generally considered the primary processing device and memory device of the CCID 150, that is, they perform functions generally associated with the processing device and the memory device of the CCID 150 such as the processing device 210 controlling the various components within the CCID 150 and the memory device 220 storing important CCID 150 data such as, but not limited to, PIN data, authentication data, sensitive data, non-sensitive data, application data, and/or log data. In some embodiments, the processing device 210 and the processing device 294 (discussed below) are the same device or are part of the same device. In some embodiments, memory device 220 and memory device 296 (discussed below) are the same device or are part of the same device.

In some embodiments of the CCID 150, a compromise detection system 290 is coupled with the data processing system 288. For example, in various embodiments, the compromise detection system 290 is coupled with the processing device 210, the memory device 220, or both. The compromise detection system 290 is configured for detecting a compromise of the CCID 150 and taking action to mitigate or eliminate the possible disclosure of sensitive data to a dishonest individual. A compromise, in some embodiments, for example, is a structural compromise of the housing 205 of the CCID 150. For example, a dishonest individual physically manipulates the housing 205 in order to gain physical access to the components housed therein. In various embodiments of the housing 205 the housing includes two or more pieces that are fit and secured together upon assembly of the CCID 150. In such a case, a dishonest individual seeking access to the components of the CCID 150 may physically separate the two or more pieces of the housing 205 thereby gaining access. In some instances, such dishonest individuals will connect a misrepresentation device such as a keylogging device or keylogger with one or more components of the CCID 150, such as the processing device 210 and/or the memory device 220 in order to access sensitive information stored or passing through. The misrepresentation device, in some instances, includes short range wireless communication capabilities such as radio communication, RFID, Bluetooth, Near Field Communication, or some other wireless communication capabilities. In such cases, the dishonest individual might place a receiver within communication range of the misrepresentation device for receiving and storing sensitive data transmitted from the misrepresentation device.

To protect against such a physical invasion of the CCID 150, the compromise detection system 290 is configured to detect the physical compromise, generate a detection signal for indicating the compromise, and communicate the detection signal to the data protection system 288. The data protection system 288 is configured to protect data stored by the CCID 150, or in other words, to take appropriate action to mitigate or eliminate the possibility of a dishonest individual gaining access to sensitive information.

In some embodiments of the compromise detection system 290, the system includes one or more detection devices 292 such as one or more sensors, for example, disposed proximal or adjacent an intersection between the pieces of the housing 205. In some such embodiments, the one or more detection devices 292 are configured to detect a separation of the pieces of the housing 205. In some embodiments, for example, the one or more detection devices 292 include one or more pressure sensors disposed on or adjacent an intersection between two or more pieces of the housing 205 such that if the pieces are separated, the one or more pressure sensors detects the separation and generates the detection signal configured for indicating the separation. In some embodiments, the one or more detection devices 292 include one or more contacts configured for completing a circuit when the pieces of the housing are secured and opening a circuit when the pieces of the housing are separated. In this regard, a detection signal indicating the separation can be generated. In other embodiments, the open circuit performs a similar function as the detection signal and the open circuit itself communicates the separation. For example, in one embodiment, the circuit is coupled with a switch, and once the circuit has been opened the switch is thrown and a detection signal is created, thereby indicating the separation of the housing pieces. In another embodiment, for example, the circuit is coupled with a processing device, and once the circuit is opened, a signal is no longer received at the processing device. In this embodiment, the processing device is configured, through program code, to recognize the lack of signal as an indication that the housing pieces have been separated. In some other embodiments, the one or more detection devices 292 are configured such that a minimal separation of the pieces of the housing does not trigger the sensors to generate a detection signal. In other embodiments, the one or more detection devices 292 are configured to communicate a detection signal regardless of the amount of separation between the pieces of the housing 205.

In some embodiments, the compromise detection system 290 includes a processing device 294 for receiving the detection signal from the one or more detection devices 292 and analyzing the detection signal to determine whether a breach of the housing 205 has occurred. In some embodiments, the one or more detection devices 292 communicate directly with the processing device 210 of the data protection system 288 rather than with a processing device 294 of the compromise detection system 290. In some embodiments, a predetermined distance threshold between the pieces of the housing 205 is stored at the processing device 294 and/or a memory device 296 of the compromise detection system 290. In some other embodiments, the predetermined distance threshold between the pieces of the housing 205 is stored at the processing device 210 and/or the memory device 220 of the data protection system 288. In some such embodiments, the detection signal generated by the one or more detection devices 292 is conditioned, if necessary, and then compared to the predetermined threshold to determine whether a breach of the housing 205 has occurred.

In other embodiments of the compromise detection system 290, the one or more detection devices 292 are, for example, one or more light sensors disposed within the housing 205 in order to detect changes, namely increases in ambient light reaching the interior of the CCID 150 such as might occur if he housing were compromised. In some such embodiments, the housing 205 of the CCID 150 is manufactured of opaque or substantially opaque materials such that little or no light is allowed to enter the housing 205 after the pieces of the housing are secured during manufacture. In other embodiments, for example, one or more detection devices 292 are disposed within the CCID 150 and configured to detect changes in the shape of the interior of the housing. In some embodiments, for example, one or more detection devices 205 monitor the interior surface of the housing 205 to ensure the housing 205 is not breached by cutting, drilling, puncture, or some other type of physical breach. In some such embodiments, the housing 205 is manufactured of one piece rather than two or more pieces, and therefore, a dishonest individual could not simply separate the two or more pieces of the housing to gain physical access, but rather, must physically alter the housing 205 in order to gain access. In some embodiments, the one or more detection devices 292 include one or more motion sensors, such as accelerometers, configured to measure acceleration or motion of the CCID 150. These embodiments may find use in a configuration where the CCID 150 is permanently mounted. Such motion sensors, should a dishonest individual attempt to dislodge the CCID 150 from its mount, are configured to detect the motion.

In some embodiments, the data protection system 288 is configured to erase some or all of the data stored within the CCID 150 in the event of a compromise of the housing 205. In some embodiments, the data protection system 288 is configured to lock the processing device 210 and/or the processing device 294 in the event-of a compromise of the housing 205. In some such embodiments, the data protection system 288 is configured to both erase some or all the data stored within the CCID 150 as well as lock one or more processing devices, such as 210 and/or 294 in the event of a compromise of the housing 205.

In some embodiments, the data stored within the CCID 150 is split. In some such embodiments, the processing device 210 is a chip and includes both a processor and a memory on the same chip. Further, in some embodiments, the CCID 150 includes a both a memory device 220 in addition to a memory 210B collocated with a processor 210A at the processing device 210. In some embodiments, the processing device 210 includes two physically separated memories collocated with a processor on one chip. In various other embodiments, various other configurations of processors and memories are envisioned, but in some embodiments, there are two or more physical memories in the CCID 150.

In some embodiments, for example, the processing device 210 has a memory 210B and the CCID 150 also has another memory, memory device 220. In some such embodiments, for example, the data of the CCID is separated into sensitive data and non-sensitive data. In some embodiments, the sensitive data is stored on the memory 210B of the processing device 210 while the non-sensitive data is stored on the memory device 220 of the CCID 150. According to embodiments of the invention, in some instances, the processing device 210 erases or formats the sensitive data and retains the non-sensitive data in the event of a compromise. Sensitive data, in some embodiments, includes authentication data, also referred to as challenge/response data, such as, for example, key data and/or PIN data. This authentication data is typically used during authentication between the CCID 150 and the backend systems 160 during a transaction, such as a PIN change transaction. Non-sensitive data, in some embodiments, includes application data, such as data or instructions for performing the function of the CCID. In some embodiments, the application data includes instructions for performing a PIN change transaction. Furthermore, in some embodiments, non-sensitive data includes log data for logging the activities of the CCID 150 including data regarding the number, type and characteristics of transactions involving the CCID 150.

In other embodiments, for example, the processing device 210 is configured to be locked, and thereby rendered inoperable, in the event of compromise. In some embodiments, the processing device 210 locks itself, and in others, another component, such as another processing device, such as processing device 294, locks processing device 210. For example, in one embodiment, the processing device 210 receives a detection signal from the compromise detection system 290, and the processing device 210 includes code stored in its memory 210B instructing it to activate a locking function, such as by toggling a locking bit, thus effectively locking the processor 210A of the processing device 210 and rendering it inoperable. In other embodiments, the processing device 294 of the compromise detection system 290 receives the detection signal from the detection device 292 and instructs the processing device 210 of the CCID 150 to toggle a locking bit effectively locking the processor 210A of the processing device 210 and rendering it inoperable. In such a case, if the CCID 150 was compromised accidentally by its owner or other honest user, for example, the CCID 150 could be returned to the bank for refurbishment or replacement of the locked processing device 210.

In some instances, a dishonest individual may recognize the processing device 210 has been locked and seek to replace the processing device 210 with his own misrepresentation processing device, thereby allowing the dishonest individual to collect sensitive information as the CCID is subsequently used in transactions. Some embodiments of the present invention are configured for preventing this type of misrepresentation by implementation of an authentication method or "challenge/response method" as discuss in greater detail below with reference to FIGS. 15-17.

In some embodiments of the compromise detection system 290, the system 290 includes one or more software modules, stored on the memory device 296, stored on the memory device 220, and/or stored on memory 210B configured to minimize or eliminate compromise of data, such as sensitive data, when executed by processing device 294 and/or processing device 210. Several embodiments of such software modules, methods and computer program products embodying such software modules and methods are discussed below with reference to FIGS. 11-14.

FIG. 3 is a flowchart illustrating a method 300 for authenticating and changing a PIN stored in the memory device of the chip card 110. First, as represented by block 310, the cardholder 105 provides a chip card 110 to the CCID 205 having a chip card input/output device 230. The chip card input/output device reads card account identification information from the chip card 110. For example, the chip card stores data corresponding to an account number identifying an account associated with the chip card 110. The chip card input/output device 230 determines the account number by reading the data stored on the chip card 110.

Next, as represented by block 320, a host 155 initiates an "online" session with the backend systems 160 maintained by the issuing bank 115. The host 155 also receives stored account identification information from the backend systems 160. For example, in one embodiment, an account owner's account number is stored in the backend system and is retrieved by the host 155 during initiation of the online session.

As represented by block 330, the CCID 150 compares the card account identification information to the stored account identification information received from the backend systems 160 in order to authenticate the cardholder as the account owner. This step, in some embodiments, is performed by the host 155, and in some embodiments, it is optional. That is, in some applications, for example, this additional layer of authentication is not required, such as during a transaction involving an amount of money under a pre-determined threshold.

Next, as represented by block 340, the PED 250 of the CCID 150 receives cardholder input corresponding to the current PIN. Then, the PED 250 receives cardholder input corresponding to the cardholder's desired new PIN as represented by block 350. In some embodiments, as discussed in further detail below, the desired new PIN is entered more than once and the entries are compared for consistency in order to ensure the cardholder properly entered the desired new PIN.

Next, as represented by block 360, the network communication device 240 of the CCID 150 communicates the new PIN to the backend systems 160 through the host 155 and the network 130. The backend systems 160 then store the PIN. In some embodiments, the backend systems 160 store data related to the actual PIN value, such as, for example an offset value that can be manipulated by applying a re-generable default PIN value in order to determine the actual PIN value. Storing an offset value in this manner provides an additional layer of misrepresentation protection over and above merely storing the PIN value itself.

Finally, as represented by block 370, the chip card input/output device 230 of the CCID 150 sends information regarding the new PIN to the chip card 110. As discussed in further detail below, the new PIN is communicated from the backend systems 160 as part of or in addition to a change PIN script created by the backend systems 160 for instructing the chip card to replace the previous PIN with the new PIN.

Referring now to FIG. 4, one embodiment of step 310, reading card account identification information from the chip card 110, is illustrated in further detail. In a first sub-step represented by block 410, the chip card input/output device 230 sends an EMV READ RECORD command to the chip card 110. The command instructs the chip card 110 to retrieve the requested information from its memory and communicate the account information associated with the chip card 110 to the chip card input/output device 230, as represented by block 420.

Referring now to FIG. 5, one embodiment of step 320 is illustrated in further detail. In step 320, the host 155 initiates an online session with the backend systems 160 maintained by the issuing bank 115. First, the cardholder interface 270 of the host 155 receives network banking authentication information from the cardholder 105 as represented by block 510. Typically, "network banking" refers to Internet banking solutions such as, for example, a secure webpage maintained by the issuing bank 115 designed to provide an account owner various tools for managing the owner's bank account while connected to the network, that is, the Internet. In other embodiments, various other networks could be used individually or in combination as discussed further regarding network 130.

Next, as represented by block 520, the host 155 communicates network banking authentication information received from the cardholder 105 over a network 130 to the backend systems 160. Then, as represented by block 530, the backend systems 160 compare the network banking authentication information received from the cardholder 105 with stored network banking authentication information. If the two match, then the cardholder 105 is authenticated as the account owner. The network banking authentication information, in one embodiment, includes a username and a password associated with the username and both associated with one or more accounts. The username and password, in this example, can be stored open, that is, with any security measures to deter misrepresentation, or may be locked, encrypted, or otherwise protected while stored in the backend systems 160.

Next, as represented by blocks 540 and 550, the backend systems 160 communicate the result of the authentication as well as the stored account identification information to the host 155 across the network 130. Then, as represented by block 560, the cardholder interface 270 of the host 155 communicates a "Change PIN" option to the cardholder 105. In one embodiment, for example, the "Change PIN" message is a link such as a hyperlink on the network/online banking webpage discussed above. In other embodiments, the option to change the PIN is communicated in another way such as a text or video message displayed on a video monitor that is part of the host 155, and in another embodiment, the change PIN option is communicated aurally, and the cardholder is given the option to respond verbally or otherwise, such as by providing input to another cardholder interface 270.

Referring now to FIG. 6, one embodiment of step 340 is illustrated in further detail. In step 340, the PED of the CCID receives cardholder 105 input corresponding to the current PIN. The first sub-step in this embodiment is represented by block 610, in which the cardholder interface 270 of the host 155 communicates a message to the cardholder 105 requesting the current PIN. Then, as represented by block 620, the PED receives the cardholder input corresponding to the current PIN in response to the communicated message. Next, as represented by block 630, the chip card input/output device 230 sends an EMV VERIFY command including data corresponding to the current PIN entered by the cardholder 105 to the chip card 110. The chip card 110, as represented by block 640, then validates the PIN entered by the cardholder by comparing it with the current PIN stored on the chip card 110.

If the PIN entered by the cardholder does not match the current PIN stored on the chip card 110, as represented by decision block 650, the PIN try limit is reduced by one as represented by block 660, and the process is re-started at sub-step 610. The PIN try limit is a pre-determined threshold of changes for a user to input a PIN before the host 155, the PED 250, the CCID 150 and/or the chip card 110 disallow the user from attempting additional PIN entries. The process of FIG. 6 may be repeated several times until a sufficient number of PIN entries have been attempted such that the PIN try limit is achieved. In some embodiments, additional measures are taken such as contacting the account owner to inform the owner that the PIN try limit was eclipsed or taking other similar pre-cautionary measures.

If the PIN entered by the cardholder does match the current PIN stored on the chip card 110, as represented by decision block 650, then the chip card 110 communicates positive validation to the chip card input/output device 230 of the CCID 150.

Referring now to FIG. 7, one embodiment of step 350 is illustrated in greater detail. In step 350, the PED receives cardholder input corresponding to the desired new PIN. In the first sub-step, as represented by block 710, the cardholder interface 270 of the host 155 communicates a message to the cardholder 105 requesting the desired new PIN. Next, as represented by block 720, the PED 250 receives cardholder 105 input corresponding to the desired new PIN in response to the communicated message. Then, in some embodiments, the desired new PIN is entered one or more additional times in order to ensure consistency and accuracy of the desired new PIN. Specifically, as represented by block 730, the cardholder interface 270 of the host 155 communicates another message to the cardholder 105 requesting the cardholder 105 provide the desired new PIN a second time. Then, the PED 250, as represented by block 740, receives the cardholder 105 input corresponding to the desired new PIN in response to the second communicated message.

Next, the CCID 150 and/or chip card 110 compares the first received desired new PIN with the second received desired new PIN as represented by block 750. As represented by decision block 760, if the first received new PIN does not match the second received new PIN, the process is repreated to sub-step 710, requesting cardholder 105 entry of the desired new PIN. If the PINs match, the CCID 150 and/or chip card 110 locks (or encrypts) the new PIN using a key stored on the chip card 110 and/or in the CCID 150 as represented by block 770.

Various types of encryption individually or in combination are used in various embodiments and in various steps and sub-steps of the methods of the invention. For example, in one embodiment, symmetric keys such as Triple-DES or AES are used to encrypt and decrypt the various messages and data communicated to and from the chip card 110. In another embodiment, for example, asymmetric keys such as RSA are used. In other embodiments, other types of encryption, cryptography or other security measures are used to secure communications and data.

Referring now to FIG. 8, one embodiment of step 360 is illustrated in greater detail. In step 360, the network communication device 240 of the CCID 150 communicates the new PIN to the backend systems 160 through the host 155 and the network 130. First, the network communication device 240 of the CCID 150 communicates the locked new PIN to the peripheral interface 280 of the host 155 as represented by block 810. Then, the host 155 communicates the locked new PIN, via the pre-established, secure online session between the host 155 and the backend systems 160, across the network to the backend systems 160. In one embodiment, for example, there is already established a Secure Sockets Layer (SSL) or Transport Layer Security (TLS) tunnel or data communication pathway established by the initiation of an online session during step 320. Accordingly, the new PIN is both locked and communicated across an encrypted tunnel for multiple layers of security.

Next, in some embodiments, the backend systems 160 re-create the key used to lock the new PIN as represented by block 830. In other embodiments, the backend systems 160 use a "secret" or private key corresponding to the public key previously used to lock the new PIN, and in these embodiments, re-creating the key (step 830) is typically unnecessary. Then, the backend systems 160 unlock the new PIN using the re-created key or the secret key as represented by block 840. In other embodiments, as discussed above, various other methods of encryption and decryption are used. Finally, as represented by block 850, the backend systems 160 store an offset value representing the new PIN. The offset value, as discussed above, provides a layer of misrepresentation protection because the PIN itself is not stored. In other embodiments, however, the PIN itself is stored or other storage methods are used, either secure or insecure.

Referring now to FIG. 9, one embodiment of step 370 is illustrated in greater detail. In step 370, the chip card input/output device 230 of the CCID 150 communicates information enabling replacing the current PIN with the new PIN on the chip card 110. In the first sub-step, as represented by block 910, the backend systems 160 prepare a PIN change script including data representing the new PIN. The script is an encrypted or message authenticated (in some embodiments) software module intended for execution by the chip card 110. Next, as represented by block 920, the backend systems 160 communicate the PIN change script across the network 130, through the host 155 to the network communication device 240 of the CCID 150. Then, as represented by block 930, the chip card input/output device 230 of the CCID 150 communicates the PIN change script to the chip card 110. Next, the chip card 110 decrypts or authenticates the PIN change script and runs the decrypted PIN change script, which instructs the chip card 110 to store the new PIN in place of the current PIN. Then, as represented by block 950, the chip card 110 communicates through the CCID 150 to the host 155 that the PIN was changed successfully. Finally, as represented by block 960, the cardholder interface 270 of the host 155 communicates a message to the cardholder 105 that the PIN was changed successfully.

Referring now to FIG. 10, one embodiment of a method 1000 for confirming the PIN change is illustrated. Method 1000 may be included along with various embodiments of method 300. For example, method 1000 may be performed immediately following method 300 discussed above.

In step 1010, the cardholder interface 270 of the host 155 communicates a message to the cardholder requesting cardholder input regarding checking the validity of the new PIN stored on the chip card 110. Next, as represented by block 1020, the PED 250 of the CCID 150 receives cardholder 105 input corresponding to the new PIN in response to the communicated message. Then the chip card input/output device 230 send an EMV VERIFY command including data corresponding to the cardholder input to the chip card 110 as represented by block 1030. Next, as represented by block 1040, the chip card 110, validates the PIN entered by the cardholder by comparing it with the current PIN stored on the chip card 110.

If the PIN entered does not match the current PIN stored on the chip card 110, as represented by decision block 1050, then the cardholder interface 270 of the host 155 communicates a message to the cardholder indicating the failed validation as represented by block 1060. At that time, the cardholder has several options including re-trying method 1000, requesting a new PIN be issued by the issuing bank, or others. If the PIN entered by the cardholder 105 matches the current PIN stored on the chip card 110 as represented by decision block 1050, the chip card communicates positive validation to the chip card input/output device 230 of the CCID 150, and in some embodiments, a message indicating the same is communicated to the cardholder via the cardholder interface 270.

Referring now to FIG. 11, according to embodiments of the present invention, a method 1100 for protecting data stored in a CCID in the event of compromise is illustrated. First, as represented by block 1105, the compromise detection system 290 of the CCID 150 detects a compromise of the CCID 150. The compromise, in some instances, is a structural compromise of the integrity of the CCID housing 205. As discussed above, in some embodiments, one or more detection devices 292 detect a compromise of the housing 205, which in various instances includes separation of two or more pieces of the housing 205 or breach of the housing 205 by cutting, drilling, puncturing or the like. In the next step, represented by block 1110, the compromise detection system 290 of the CCID 150 generates a detection signal indicating the compromise has occurred. In some embodiments, the one or more detection devices 292 generate the detection signal, and in other embodiments, the one or more detection devices 292 are coupled with a processing device 294 that generates the detection signal. In some embodiments, the one or more detection devices 292 generate initial signals that a processing device, such as 294, conditions, such as by amplification, filtering and the like, thereby generating the detection signal. The compromise detection system 290, as discussed above, is coupled with other components of the CCID 150 such as the data protection system 288 and one or more of its components, such as the processing device 210 and/or the memory device 220. The compromise detection system 290 communicates the detection signal to the data protection system 288, as represented by block 1115. In some embodiments, the compromise detection system 290 communicates the detection signal to the processing device 210, which receives and analyses the detection signal as represented by block 1120. In some other embodiments, the compromise detection system 290 generates a detection signal, which is a raw signal generated by the one or more detection devices 292, and immediately communicates the detection signal without conditioning. In some such embodiments, the processing device 210 of the CCID, alone, or in conjunction with additional circuitry, such as conditioning circuitry, conditions the detection signal if necessary.

Then, in some embodiments, the processing device 210 of the data protection system 288 analyses the detection signal to determine whether the detection signal indicates a compromise, which is also represented by decision block 1125. If the processing device 210 determines the detection signal does not indicate a compromise, the CCID 150 resumes normal operation, as represented by block 1130. In some embodiments, the compromise detection system 290 continuously, periodically, or regularly generates a signal representing the status of the one or more detection devices 292 such that the signal indicates whether a compromise has occurred. The compromise detection system 290 then communicates the detection signal to the processing device 210, in various embodiments, continuously, periodically and/or regularly. Further, in some such embodiments, the continuous, periodic, or regular detection signal generated and communicated by the compromise detection system 290 sometimes indicates there has been no compromise if that is the case and indicates there has been a compromise if that is the case. In other words, in these embodiments, the detection signal, merely because it is generated and communicated to the processing device 210 does not necessary indicate a compromise has taken place. For example, in one embodiment, the detection signal is generated and communicated constantly at a level of five volts; however, if a compromise occurs, the compromise detection system 290 is configured to generate and communicate a detection signal at a level of one volt. The processing device 210 of the data protection system 288 is programmed to analyze the detection signal and determine whether a compromise has occurred. Specifically, for example, the processing device 210 may determine that, if the detection signal drops below a predetermined threshold, such as two volts, for a predetermined period of time, such as five seconds, then the compromise detection system is indicating that a compromise has occurred. In other example embodiments, the detection signal generated and communicated is a digital signal and indication that a compromise has occurred is, in some embodiments, based on whether a predetermined bit in a bitstream is positive or negative, or a one or zero.

If the processing device determines the detection signal indicates a compromise has occurred, as represented by decision block 1125, the data protection system 288 protects data stored at the CCID 150 based at least in part on the received and analyzed detection signal, as represented by block 1135. In various embodiments of step 1135, the data protection system 288 takes one or more data protection steps as discussed below with reference to FIGS. 12-14. In some embodiments, memory is erased, in other embodiments, the processing device is rendered inoperable, and in yet other embodiments, both the memory is erased and the processing device is rendered inoperable.

Referring now to FIG. 12, a method 1200 for erasing data stored in the CCID is illustrated. Step 1135 from FIG. 11 involves the data protection system 288 protecting data stored at the CCID 150 based at least in part on the received and analyzed detection signal. In the embodiment shown in FIG. 12, for example, step 1135 includes erasing data. As represented by block 1210, the data protection system processing device 210, based at least in part on the analyzed detection signal indicating a compromise, communicates instructions to erase some or all data stored in the CCID 150. In some embodiments, the data to be erased is stored in the memory device 220, the memory 210B, or both. As represented by block 1220, the data protection system memory device 220 and/or the memory 210B of the processing device 210 receive the instructions communicated from the processing device 210. As represented by block 1230, the data protection system memory device 220 and/or memory 210B of the processing device 210 erase some or all data stored thereon based at least in part on the instructions received from the data protection system processing device 210. In some embodiments, the data is permanently erased and/or the memory(ies) is/are formatted.

In some embodiments, as discussed above, the processing device 210 only instructs the memory(ies) to erase a portion of the stored data, which, in some such embodiments is the sensitive data such as key data and PIN data. In some embodiments, the sensitive data is physically separated from the non-sensitive data so that erasure of the sensitive data in the event of compromise allows for retaining non-sensitive data such as application data and/or log data. In some embodiments, a processor or processing device other than the processing device 210 instructs erasure of some or all the stored data. In some other embodiments, some or all the data to be erased is stored in one or more memories or memory devices other than memory device 220 or memory 210B.

Referring now to FIG. 13, a method 1300 for locking a processing device of the CCID is illustrated. Step 1135 from FIG. 11 involves the data protection system 288 protecting data stored at the CCID 150 based at least in part on the received and analyzed detection signal. In the embodiment shown in FIG. 13, for example, step 1135 includes locking the processing device. As represented by block 1310, the data protection system processing device 210 receives instructions, based at least in part on the analyzed detection signal indicating a compromise, to lock the data protection system processing device 210, thereby rendering it inoperable. In some embodiments, the instructions were generated and communicated by the compromise detection system processing device 294, based at least in part on the analyzed detection signal indicating a compromise. In such embodiments, the processing device 210 may not have received a previous communication, such as a detection signal, indicating the compromise, but rather, merely receives a communication including instructions for locking itself. In other embodiments, the processing device 210, receives and analyzes the detection signal and determines instructions for locking itself based on the indicated compromise.

Next, as represented by block 1320, the data protection system processing device 210 activates a locking function, thereby locking the processing device and rendering it inoperable. As discussed above, in some embodiments, the processing device 210 locks itself (and/or its processor 210A and memory 210B) and in other embodiments another component of the CCID, such as another processor or processing device, for example processing device 294 of the compromise detection system 290 sends instructions for locking the processing device 210 (and/or its processor 210A and memory 210B).

As mentioned above, in some embodiments, both methods 1200 and 1300 are performed in the event of a compromise. In some embodiments, method 1200 is performed before step 1300, as the processing device must, in some cases, instruct the erasure of the memory before it is rendered inoperable. In some embodiments, methods 1200 and 1300 are performed concurrently or substantially concurrent if possible. Of course, in these embodiments, if the processing device 210 is instructing erasure of the memory, it must perform such instructions before being rendered inoperable. However, in some embodiments, the memory is erased by one or more other devices, such as by another processing device, for example processing device 294 of the compromise detection system 290. In such cases, and in some embodiments therefore, method 1300 can be performed before, overlapping, concurrently with, or after step 1200.

Referring now to FIG. 14, a method 1400 for erasing only sensitive data stored in the CCID is illustrated. First, as represented by block 1410, the data protection system processing device 210 separates sensitive data from non-sensitive data. In some embodiments, the sensitive data is initially stored in a particular location within a specific memory or memory device, such as at memory 210B. Likewise, in some embodiments, the non-sensitive data is initially stored in a particular location within a specific memory or memory device, such as memory device 220. In various other embodiments, the sensitive data is stored in any location on memory 210B and non-sensitive data is stored in any location on memory device 220. In other embodiments, the sensitive data is stored in a specific location on a memory or memory device and the non-sensitive data is stored in a specific location different than the sensitive data on the same memory or memory device. In some embodiments, the sensitive data and the non-sensitive data is stored co-mingled and the processing device separates it subsequently, and in other embodiments, the data is stored co-mingled, but a log of the locations of the separate types of data is kept so that retrieval of sensitive data for erasure is made possible.

Next, the compromise detection system of the CCID detects a compromise of the CCID, a detection signal is generated and communicated, and the processing device analyzes the detection signal (as discussed above with reference to FIG. 12). Method 1200 is represented in FIG. 14 by block 1200 and includes the data protection system processing device 210 instructing one or more memory(ies) to erase some or all data stored thereon based on the analyzed detection signal, and the one or more memory(ies) erasing the data as instructed. In the embodiment shown, however, only sensitive data is to be destroyed. Thus, as represented by block 1420, the data protection system processing device 210, based at least in part on the detected compromise, permanently erases or formats only the sensitive data stored at the CCID so that it cannot be accessed. As represented by block 1430, the data protection system memory device 220 and/or the memory 210B of the processing device 210 receive instructions communicated from the processing device 210. Finally, as represented by block 1440, the data protection system memory device 220 and/or the memory 210B of the processing device 210 erase some or all sensitive data stored thereon and retain some or all non-sensitive data based at least in part on the instructions received from the processing device 210. In some embodiments, all the sensitive data is erased and all the non-sensitive data is retained. In others, various portions of sensitive data are retained and various portions of non-sensitive data are erased. In embodiments where non-sensitive data is retained, it can be accessed in the future. As discussed elsewhere, sensitive data, in some embodiments, includes, for example, authentication data such as PINs and/or key data, and non-sensitive data includes, for example, application data and log data.

In some alternate embodiments, however, the processing device 210 instructs the memory(ies) to erase non-sensitive data as well. For example, in the event of a compromise non-sensitive data such as application data and/or log data can be erased. In some instances, erasing application data is useful as it can deter the dishonest individual from attempting to reuse the processing device in further misrepresentation endeavors. As discussed elsewhere, of course, the sophisticated fraudster could replace the processing device having no application data with a fraudulent processing device and attempt to reuse the CCID, in which case, the authentication methods, as discussed below, should prevent the dishonest individual from succeeding.

Referring now to FIG. 15, according to embodiments of the present invention, a method 1500 for authenticating the CCID with the backend system is illustrated. First, as represented by block 1510, the CCID initiates a transaction with the backend system. In one embodiment, for example, a PIN change transaction for a chip card is initiated. Next, as represented by block 1520, the backend system validates the identity of the CCID. In one embodiment, for example, the backend system uses an encryption technique to authenticate an encryption key stored at the CCID during manufacture, thereby validating the identity of the CCID. Example embodiments of this technique are discussed with reference to FIGS. 16 and 17 below.

Next, as represented by block 1530, the backend system makes a determination as to whether the CCID is authentic and therefore has permission to continue the initiated transaction. If the backend system determines the CCID is not authentic, the backend system terminates the transaction as represented by block 1540. If the backend system determines the CCID is authentic, and therefore has permission to continue with the initiated transaction, the backend system resumes and completes the transaction, as represented by block 1550.

Referring now to FIG. 16, a method 1600 for setting up encryption authentication is illustrated according to embodiments of the present invention. First, as represented by block 1610, the backend systems store a master chip key (MCK). Next, as represented by block 1620, the backend systems create a unique chip key (UCK) corresponding with the MCK. For example, in one embodiment, the UCK is based on the serial number of the processing device 210 and/or processor 210A of the CCID 150 and is created using the MCK. The UCK is configured for storage at the CCID, either in the memory device 220 or memory 210B. The UCK is further configured for subsequently assisting in authenticating the CCID with the backend systems. Finally, as represented by block 1630, the CCID stores the UCK. In some embodiments, the UCK is stored in the memory device 220, and in others the UCK is stored in the memory 210B collocated with the processing device 210. In some embodiments, the UCK is stored as sensitive data in the memory 210B of the processing device 210, and in some such embodiments, the processing device 210 is a chip. Once the UCK has been stored at the CCID, the CCID is typically given to the customer for use in transactions, such as, for example, for use in online PIN change transactions with a chip card.

Referring now to FIGS. 17A and 17B, a method 1700 for authenticating a CCID with a backend system according to embodiments of the present invention is illustrated. Method 1700 is also referred to as a challenge/response method. First, as represented by block 1710, the CCID initiates an interaction with the backend system. For example, in one embodiment, the customer has requested a PIN change for a chip card, and the CCID initiates the PIN change transaction with the backend system. Next, as represented by block 1720, the backend system sends a random number (RN) to the CCID. The CCID receives the RN at its network communication device, and in some embodiments stores the RN, either at the memory device 220 and/or at the memory 210B. Next, as represented by block 1730, the CCID symmetrically encrypts the RN with the UCK stored on the memory device 220 or the memory 210B. Various methods of encryption are used in various embodiments. For example, in one embodiment, the triple data encryption algorithm (3DES) is used, and in another embodiment, for example, the advanced encryption standard (AES) is used. In various other embodiments, types of encryption other than these examples are used. Next, as represented by block 1740, the network communication device of the CCID communicates the encrypted RN and the CCID serial number to the backend system. The CCID serial number, in some embodiments is the serial number or identification number of the processing device 210 and in other embodiments it is the serial number or identification number of processor 210A (which may be the same as processing device 210). In other embodiments, the CCID has a serial number or identification number separate and distinct from the processing device and/or its processor, and that number is communicated to the backend systems in some embodiments. In various other embodiments, some other type of identification number is communicated, such as a number corresponding with one or more of the other components of the CCID. In some embodiments, the processing device 210 is or includes a chip, and the serial number corresponds to the chip.

Referring now to FIG. 17B, method 1700 continues at block 1750, which represents the backend system recalculating the UCK by encrypting the received serial number using the stored MCK. Next, as represented by block 1760, the backend system encrypts a copy of the RN originally sent to the CCID in step 1720 using the recalculated UCK. The backend system, as represented by block 1770, then compares the encrypted copy of the RN originally sent to the CCID and the encrypted RN received from the CCID. The backend system then makes a determination whether the encrypted copy of the RN matches the received encrypted RN as represented by decision block 1780. If it does not, as represented by block 1785, the backend system terminates the transaction, and in some embodiments, logs the serial number received from the CCID as a potentially misrepresentation device. If the encrypted copy of the RN matches the received encrypted RN, as represented by block 1790, the CCID is considered authentic, and the backend system proceeds with the transaction. In one embodiment, for example, the backend system proceeds with the PIN change transaction initiated by the CCID.

In various embodiments, both methods 1200 and 1300 are performed, and in other embodiments, only one or the other are performed in response to a compromise. Further, in various embodiments, various combinations of methods 1100, 1200, 1300, 1400, 1500, 1600, and 1700 are used. For example, in one embodiment, the CCID and backend systems are configured to perform the authentication methods, namely methods 1500, 1600, and 1700 or variations thereof and do not perform method 1100 including erasing the memory (method 1200) and locking the processor (method 1300). In another embodiment, for example, the CCID is configured to lock the processor (method 1300) and the CCID and backend systems are configured for the authentication methods and/or variations thereof (methods 1500-1700). In yet another embodiment, for example, the CCID is configured to erase the memory (method 1200), is not configured to lock the processor (method 1300), but is configured to perform the authentication methods and/or variations thereof (methods 1500-1700).

In summary, according to embodiments of the present invention, systems such as CCIDs, methods, and computer program products are provided for protecting data stored in a CCID in the event of a compromise of the housing of the CCID. The CCID has a housing and a compromise detection system including one or more detection devices configured for detecting a compromise of the housing. The compromise detection system is configured for generating a detection signal indicating the detected compromise. A data protection system is coupled with the compromise detection system and includes a memory device and a processing device coupled with the compromise detection system. The processing device is for receiving the detection signal and erasing data stored on the memory device based on the detection signal in some embodiments. In some embodiments, the processing device also activates a locking function for rendering itself inoperable based on the detection signal.

As will be appreciated by one of skill in the art, the present invention may be embodied as a method, apparatus (including a system), computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system."

Furthermore, embodiments of the present invention may take the form of a computer program product comprising a computer-readable storage medium having computer-usable program code/computer-readable instructions embodied in the medium. Any suitable computer-readable medium may be utilized. The computer-readable medium may be, for example but not limited to, a non-transitory, tangible medium such as an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet.

Computer-readable instructions for carrying out operations of the present invention may be written in an object-oriented, scripted or unscripted programming language such as Java, Perl, Smalltalk, C++, or the like. However, the computer-readable instructions for carrying out operations of the invention may also be written in conventional procedural programming languages, such as the "C" programming language or similar programming languages.

Embodiments of the present invention are described above with reference to flowchart illustrations and/or block diagrams of methods, apparatuses (systems) and computer program products according to embodiments of the invention. It will be understood that each block of the flowchart illustrations and/or block diagrams shown in FIGS. 1-17, and combinations of blocks in the flowchart illustrations and/or block diagrams, can be implemented by computer-readable instructions. These computer-readable instructions may be provided to a processor of a general purpose computer, a special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer-readable program instructions may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block or blocks.

The computer-readable program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A chip card interface device (CCID) configured for protecting data stored at the CCID in the event of a compromise, the CCID comprising:

a housing;

a memory device disposed within the housing, the memory for storing data, the data comprising sensitive data and non-sensitive data, and wherein the sensitive data is stored in a sensitive data location that is separate and distinct from a non-sensitive data location in which the sensitive data is stored;

a compromise detection system, the compromise detection system comprising:

one or more detection devices configured for detecting a compromise of the housing, the compromise detection system configured for continuously or periodically generating a detection signal that, when a compromise of the housing is detected, indicates the detected compromise, the one or more detection devices comprising one or more motion sensors configured to measure acceleration of the CCID; and a data protection system coupled with the compromise detection system, the data protection system configured for:

receiving the detection signal indicating the compromise; and protecting the data stored in the memory based at least in part on the received detection signal indicating the compromise of the housing, the protecting comprising:

erasing the sensitive data; and retaining the non-sensitive data;

a personal identification number (PIN) entry device (PED) configured for receiving a cardholder current PIN and a cardholder desired new PIN from a cardholder;

a chip card input/output device configured for communicating a verify command to a chip card of the CCID including data corresponding to the received cardholder current PIN, the chip card input/output device also configured for receiving a verification message from the chip card, wherein the chip card generates the verification message by validating the received cardholder current PIN by comparing it with the current PIN stored on the chip card; and a processing device for determining that the verification message from the chip card indicates that authentication of the cardholder current PIN was successful.

2. The CCID of claim 1, wherein the memory device is configured for:

erasing some or all the stored data based at least in part on the received detection signal indicating the compromise.

3. The CCID of claim 2, wherein the processing device is further configured for:

receiving the detection signal from the compromise detection system;

analyzing the detection signal to determine whether the detection signal indicates a compromise; and instructing the memory device to erase some or all data stored at the memory device based at least in part on a determination that the detection signal indicates a compromise.

4. The CCID of claim 3, wherein:

the processing device is further configured for:

conditioning the received detection signal before analyzing.

5. The CCID of claim 3, wherein:

the memory device is collocated with the processing device on a chip.

6. The CCID of claim 3, wherein:

the processing device is disposed on a chip; and the memory device is not disposed on the chip.

7. The CCID of claim 2, wherein the memory device is coupled with the compromise detection system, the memory device further configured for:

receiving the detection signal generated by the compromise detection system, the detection signal including a command to erase some or all the data stored in the memory device; and following the command by erasing some or all the data.

8. The CCID of claim 2, wherein the processing device comprises the memory device.

9. The CCID of claim 8, wherein the processing device is disposed on a chip.

10. The CCID of claim 8, wherein the memory device is configured for:

storing sensitive data; and erasing the sensitive data in response to the detection signal indicating the compromise.

11. The CCID of claim 10, wherein the memory device is further configured for:

storing non-sensitive data in a non-sensitive data location distinct from a sensitive data location where the sensitive data is stored;

erasing the sensitive data in response to the detection signal indicating the compromise; and retaining the non-sensitive data.

12. The CCID of claim 10, wherein the sensitive data comprises PIN data or key data.

13. The CCID of claim 11, wherein the non-sensitive data comprises application data or log data.

14. The CCID of claim 1, wherein the data protection system comprises:

a processing device coupled with the compromise detection system, the processing device configured for:

receiving the detection signal indicating the compromise; and activating a locking function configured for rendering the processing device inoperable, based at least in part on the received detection signal.

15. The CCID of claim 14, wherein the processing device further comprises:

after receiving the detection signal, analyzing the detection signal to determine whether the detection signal indicates a compromise.

16. The CCID of claim 15, wherein the compromise detection system further comprises a detection processing device coupled with the one or more detection devices, the detection processing device configured for:

receiving, from the one or more detection devices, a raw signal indicating a compromise; and generating the detection signal indicating the compromise, based at least in part on the raw signal.

17. The CCID of claim 16, wherein the detection processing device is further configured for:

generating the detection signal indicating the compromise, the detection signal comprising instructions for activating the locking function configured for rendering the processing device of the data protection system inoperable.

18. A method for protecting data stored at a chip card interface device (CCID) in the event of a compromise, the method comprising:

detecting, by one or more detection devices of a compromise detection system, a compromise of a housing of the CCID, the compromise detection system comprising one or more motion sensors configured to measure acceleration of the CCID;

continuously or periodically generating, by the compromise detection system, a detection signal that, when a compromise of the housing is detected, indicates the detected compromise;

receiving, at a data protection system, the detection signal indicating the compromise; and protecting, by the data protection system, data stored in a memory device disposed within the housing based at least in part on the received detection signal indicating the compromise of the housing, the protecting comprising:

erasing sensitive data stored in a sensitive data memory location; and retaining non-sensitive data that is stored in a non-sensitive data memory location, wherein the non-sensitive data memory location is separate and distinct from the sensitive data memory location;

receiving, at a personal identification number (PIN) entry device (PED), a cardholder current PIN and a cardholder desired new PIN from a cardholder;

communicating, by a chip card input/output device, a verify command to a chip card of the CCID including data corresponding to the received cardholder current PIN, the chip card input/output device also being configured for receiving a verification message from the chip card, wherein the chip card generates the verification message by validating the received cardholder current PIN by comparing it with the current PIN stored on the chip card; and determining, by a processing device of the data protection system, that the verification message from the chip card indicates that authentication of the cardholder current PIN was successful.

19. The method of claim 18, wherein protecting the data stored in the memory device comprises:

erasing, by the memory device, some or all the stored data based at least in part on the received detection signal indicating the compromise.

20. The method of claim 19, further comprising:

receiving, at a processing device of the data protection system, the detection signal from the compromise detection system;

analyzing, by the processing device, the detection signal to determine whether the detection signal indicates a compromise; and instructing, by the processing device, the memory device to erase some or all data stored at the memory device based at least in part on a determination that the detection signal indicates a compromise.

21. The method of claim 20, further comprising:

conditioning, by the processing device, the received detection signal before analyzing.

22. The method of claim 20, wherein:

the memory device is collocated with the processing device on a chip.

23. The method of claim 20, wherein:

the processing device is disposed on a chip; and the memory device is not disposed on the chip.

24. The method of claim 19, further comprising:

receiving, at the memory device, the detection signal generated by the compromise detection system, the detection signal including a command to erase some or all the data stored in the memory device; and following, by the memory device, the command by erasing some or all the data.

25. The method of claim 19, wherein the processing device comprises the memory device.

26. The method of claim 25, wherein the processing device is disposed on a chip.

27. The method of claim 25, further comprising:

storing, at the memory device, sensitive data; and erasing, by the memory device, the sensitive data in response to the detection signal indicating the compromise.

28. The method of claim 27 further comprising:

storing, at the memory device, non-sensitive data in a non-sensitive data location distinct from a sensitive data location where the sensitive data is stored;

erasing, by the memory device, the sensitive data in response to the detection signal indicating the compromise; and retaining, at the memory device, the non-sensitive data.

29. The method of claim 27, wherein the sensitive data comprises PIN data or key data.

30. The method of claim 28, wherein the non-sensitive data comprises application data or log data.

31. The method of claim 18, further comprising:

receiving, at a processing device coupled with the compromise detection system, the detection signal indicating the compromise; and wherein protecting comprises:

activating, by the processing device, a locking function configured for rendering the processing device inoperable, based at least in part on the received detection signal.

32. The method of claim 31, wherein after receiving the detection signal, analyzing, by the processing device, the detection signal to determine whether the detection signal indicates a compromise.

33. The method of claim 32, further comprising:

receiving from the one or more detection devices, at a detection processing device of the compromise detection system, the detection processing device coupled with the one or more detection devices, a raw signal indicating a compromise; and generating, by the detection processing device, the detection signal indicating the compromise, based at least in part on the raw signal.

34. The method of claim 33, wherein generating the detection signal indicating the compromise, the detection signal comprises instructions for activating the locking function configured for rendering the processing device of the data protection system inoperable.

35. A computer program product comprising a non-transitory computer-readable medium comprising computer-readable instructions for execution by a chip card interface device (CCID), the instructions configured for protecting data stored in the CCID in the event of a compromise, the instructions comprising:

instructions for detecting, by one or more detection devices of a compromise detection system, a compromise of a housing of the CCID, the compromise detection system comprising one or more motion sensors configured to measure acceleration of the CCID;

instructions for generating, continuously or periodically and by the compromise detection system, a detection signal that, when a compromise of the housing is detected, indicates the detected compromise;

instructions for receiving, at a data protection system, the detection signal indicating the compromise; and instructions for protecting, by the data protection system, data stored in a memory device disposed within the housing based at least in part on the received detection signal indicating the compromise of the housing, the protecting comprising:

erasing sensitive data stored in a sensitive data memory location; and retaining non-sensitive data that is stored in a non-sensitive data memory location, wherein the non-sensitive data memory location is separate and distinct from the sensitive data memory location;

instructions for receiving, at a personal identification number (PIN) entry device (PED), a cardholder current PIN and a cardholder desired new PIN from a cardholder;

instructions for communicating, by a chip card input/output device, a verify command to a chip card of the CCID including data corresponding to the received cardholder current PIN, the chip card input/output device also being configured for receiving a verification message from the chip card, wherein the chip card generates the verification message by validating the received cardholder current PIN by comparing it with the current PIN stored on the chip card; and instructions for determining, by a processing device of the data protection system, that the verification message from the chip card indicates that authentication of the cardholder current PIN was successful.

36. The computer program product of claim 35, wherein the instructions for protecting the data stored in the memory device comprise:

instructions for erasing, by the memory device, some or all the stored data based at least in part on the received detection signal indicating the compromise.

37. The computer program product of claim 36, the instructions further comprising:

instructions for receiving, at a processing device of the data protection system, the detection signal from the compromise detection system;

instructions for analyzing, by the processing device, the detection signal to determine whether the detection signal indicates a compromise; and instructions for instructing, by the processing device, the memory device to erase some or all data stored at the memory device based at least in part on a determination that the detection signal indicates a compromise.

38. The computer program product of claim 37, the instructions further comprising:

instructions for conditioning, by the processing device, the received detection signal before analyzing.

39. The computer program product of claim 36, wherein the instructions further comprise:

instructions for receiving, at the memory device, the detection signal generated by the compromise detection system, the detection signal including a command to erase some or all the data stored in the memory device; and instructions for following, by the memory device, the command by erasing some or all the data.

40. The computer program product of claim 36, the instructions for storing comprising:

instructions for storing, at the memory device, sensitive data; and wherein the instructions for erasing comprise:

instructions for erasing, by the memory device, the sensitive data in response to the detection signal indicating the compromise.

41. The computer program product of claim 40, the instructions for storing comprising:

instructions for storing, at the memory device, non-sensitive data in a non-sensitive data location distinct from a sensitive data location where the sensitive data is stored; and instructions for retaining, at the memory device, the non-sensitive data.

42. The computer program product of claim 35, the instructions further comprising:

instructions for receiving, at a processing device coupled with the compromise detection system, the detection signal indicating the compromise; and wherein the instructions for protecting comprise:

instructions for activating, by the processing device, a locking function configured for rendering the processing device inoperable, based at least in part on the received detection signal.

43. The computer program product of claim 42, wherein the instructions further comprise:

instructions for, after receiving the detection signal, analyzing, by the processing device, the detection signal to determine whether the detection signal indicates a compromise.

44. The computer program product of claim 43, the instructions further comprising:

instructions for receiving from the one or more detection devices, at a detection processing device of the compromise detection system, the detection processing device coupled with the one or more detection devices, a raw signal indicating a compromise; and instructions for generating, by the detection processing device, the detection signal indicating the compromise, based at least in part on the raw signal.

45. The computer program product of claim 44, wherein the instructions for generating the detection signal indicating the compromise, the detection signal comprises instructions for activating the locking function configured for rendering the processing device of the data protection system inoperable.

46. A chip card interface device (CCID) configured for protecting data stored at the CCID in the event of a compromise, the CCID comprising:

a housing;

a compromise detection system, the compromise detection system comprising:

one or more detection devices configured for detecting a compromise of the housing, the compromise detection system configured for continuously or periodically generating a detection signal that, when a compromise of the housing is detected, indicates the detected compromise of the housing, and the one or more detection devices comprising one or more motion sensors configured to measure acceleration of the CCID; and a data protection system coupled with the compromise detection system, the data protection system comprising:

a processing device coupled with the compromise detection system, the processing device configured for:

receiving the detection signal indicating the compromise; and activating a locking function configured for rendering the processing device inoperable, based at least in part on the received detection signal indicating the compromise of the housing; and a memory device disposed within the housing configured for:

storing some or all the data, the data comprising sensitive data and non-sensitive data, and wherein the sensitive data is stored in a sensitive data location that is separate and distinct from a non-sensitive data location in which the sensitive data is stored;

erasing the sensitive data based at least in part on the received detection signal indicating the compromise of the housing; and retaining the non-sensitive data based at least in part on the received detection signal indicating the compromise of the housing;

a personal identification number (PIN) entry device (PED) configured for receiving a cardholder current PIN and a cardholder desired new PIN from a cardholder;

a chip card input/output device configured for communicating a verify command to a chip card of the CCID including data corresponding to the received cardholder current PIN, the chip card input/output device also configured for receiving a verification message from the chip card, wherein the chip card generates the verification message by validating the received cardholder current PIN by comparing it with the current PIN stored on the chip card; and a processing device for determining that the verification message from the chip card indicates that authentication of the cardholder current PIN was successful.

* * * * *